US 6,572,384 B1

(12) United States Patent
Marchevsky

(10) Patent No.: US 6,572,384 B1
(45) Date of Patent: Jun. 3, 2003

(54) METHOD AND APPARATUS FOR INTERCONNECTING CIRCUIT CARDS

(75) Inventor: Bruno P. Marchevsky, Evanston, IL (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/779,142

(22) Filed: Feb. 8, 2001

(51) Int. Cl.[7] .............................................. H01R 27/00
(52) U.S. Cl. ................................... 439/43; 710/104
(58) Field of Search ........................ 439/43, 680, 660, 439/59, 61, 62; 710/104, 105, 107, 307

(56) References Cited

U.S. PATENT DOCUMENTS

| | | | | |
|---|---|---|---|---|
| 3,963,301 A | * | 6/1976 | Stark ........................... | 439/680 |
| 5,172,306 A | * | 12/1992 | Cantrell ..................... | 211/41.17 |
| 5,239,631 A | * | 8/1993 | Boury et al. ................ | 710/117 |
| 5,430,615 A | * | 7/1995 | Keeth et al. ................ | 361/784 |
| 5,537,659 A | * | 7/1996 | Nakao ......................... | 710/107 |
| 5,947,748 A | * | 9/1999 | Licht et al. .................... | 439/59 |
| 6,021,455 A | * | 2/2000 | Kondo et al. ................ | 710/113 |
| 6,044,305 A | * | 3/2000 | Larson et al. ................. | 700/11 |
| 6,146,150 A | * | 11/2000 | Roberts ........................ | 439/55 |
| 6,256,692 B1 | * | 7/2001 | Yoda et al. ................. | 710/100 |
| 6,302,700 B1 | * | 10/2001 | Puri et al. ..................... | 439/59 |
| 6,334,793 B1 | * | 1/2002 | Amoni et al. ............... | 439/639 |

OTHER PUBLICATIONS

"ARC—The Open Communications Riser Standard", ACR Newsletter—vol. 1, May 15, 2000 (4 pages).

* cited by examiner

Primary Examiner—P. Austin Bradley
Assistant Examiner—Edwin A. León
(74) Attorney, Agent, or Firm—McDonnell Boehnen Hulbert & Berghoff

(57) ABSTRACT

A method and system for interconnecting circuit cards is provided. Pins on a bus of a circuit card are grouped corresponding to each device on the card. Pins on the bus of the motherboard are grouped corresponding to each device on the motherboard. The groups of pins are matched with the devices on the card to appropriate devices on the motherboard. The size of the bus and circuit card can be adjusted in response to the number of pins needed.

18 Claims, 15 Drawing Sheets

| Address | Data | Comments |
|---|---|---|
| 0 | 41h | ASCII character 'A' |
| 1 | 43h | ASCII character 'C' |
| 2 | 52h | ASCII character 'R' |
| 3 | 00h | Format revision level. This is format 0. |

FIG. 3A

| Offset | Size | Comments |
|---|---|---|
| 0 | 1 | Object Header Byte: One byte containing Tag and Bus. The 4 MSBs are the Tag field, the 4 LSBs represent the Bus field. |
| 1 | 1 | Object Size Byte: Object flags and Len field, containing the number of bytes of data items in the object descriptor. |
| 2 | Variable | Data items. |

FIG. 3B

| 7 | 6 | 5 | 4 | 3 | 2 | 1 | 0 |
|---|---|---|---|---|---|---|---|
| Tag | | | | Bus | | | |

| Tag | Name | Object |
|---|---|---|
| 0 | TAG_END | End of object descriptor table |
| 1 | TAG_RISER | Riser card |
| 2 | TAG_SOUND | Sound device |
| 3 | TAG_MODEM | Voice band modem device |
| 4 | TAG_HPNA | Home networking device |
| 5 | TAG_ETHER | Ethernet device |
| 6 | TAG_DSL | DSL modem device |
| 7 | TAG_WLESS | Wireless device |
| 8 | TAG_CABLE | Cable modem |
| 9 | TAG_EEPROM | EEPROM device descriptor |
| 10 | TAG_EXEC | Executable code |
| 11 | TAG_OTHER | Other devices |
| 12-15 | | Reserved |

| Bus | Name | Object |
|---|---|---|
| 0 | BUS_NONE | Object does not use a bus |
| 1 | BUS_ACLINK | Object connects to the AC-Link bus |
| 2 | BUS_USB | Object connects to the USB bus |
| 3 | BUS_IPB | Object connects to the IPB bus |
| 4 | BUS_MII_1 | Object connects to the 1$^{st}$ (primary) MII interface bus |
| 5 | BUS_MII_2 | Object connects to the 2$^{nd}$ (secondary) MII interface bus |
| 6 | BUS_WLESS | Object connects to the wireless bus |
| 7 | BUS_SERIAL | Object connects to the Serial bus |
| 8 | BUS_SPI | Object connects to the GPSI with SPI bus |
| 9 | BUS_MDIO | Object connects to the GPSI with MDIO bus |
| | | |
| 10-15 | | Reserved |

FIG. 3C

| 7 | 6 | 5 | 4 | 3 | 2 | 1 | 0 |
|---|---|---|---|---|---|---|---|
| Mobo | Long | Len | | | | | |

| Bit | Name | Description |
|---|---|---|
| 7 | Mobo | 0: Object is physically mounted on riser card<br>1: Object is physically mounted on the motherboard. |
| 6 | Long | 0: Len field contain the number of bytes in the object.<br>1: Len field contain the 6 MSB's of a 14-bit Len. The 8 LSB'S of len must be specified immediately after the Object Size Byte and before the data payload. |
| 5-0 | Len | Object Len |

FIG. 3D

| Offset | Size | Description |
|---|---|---|
| 0 | 1 | Tag and Bus field. Must always be 00h. |
| 1 | 1 | Len field, must always be set to 01h |
| 2 | 1 | 8-bit checksum. The sum of all bytes in the Enumeration Area must add up to 0FFh |

FIG. 3E

| | | | |
|---|---|---|---|
| B1 | Audio Mute | AUDIO PWRDN | A1 |
| B2 | GND | MONO PHONE | A2 |
| B3 | MONO OUT/PC Beep | RESERVED | A3 |
| B4 | RESERVED | RESERVED | A4 |
| B5 | RESERVED | RESERVED | A5 |
| B6 | Primary DN# | GND | A6 |
| B7 | .+12v | .+5 dual/+5v SB | A7 |
| B8 | GND | USB OC# | A8 |
| B9 | .+12v | GND | A9 |
| B10 | GND | USB+ | A10 |
| B11 | .+5 Digital | USB- | A11 |
| B12 | GND | GND | A12 |
| B13 | RESERVED | S/P DIF IN | A13 |
| B14 | RESERVED | GND | A14 |
| B15 | .+3.3V Digital | .+3.3v dual/+3.3v SB | A15 |
| B16 | GND | GND | A16 |
| B17 | AC97 SDATA OUT | AC97 SYNC | A17 |
| B18 | AC97 RESET # | GND | A18 |
| B19 | AC97 SDATA IN3 | AC97 SDATA IN1 | A19 |
| B20 | GND | GND | A20 |
| B21 | AC97 SDATA IN2 | AC SDATA IN0 | A21 |
| B22 | GND | GND | A22 |
| B23 | AC97-MSTRCLK | AC97 BITCLK | A23 |
| B24 | SCL | SDL | A24 |
| B25 | MDIO | MDC | A25 |
| B26 | RXD3 | TXD3 | A26 |
| B27 | RXD2 | TXD2 | A27 |
| B28 | RXD1 | TXD1 | A28 |
| B29 | RXD0 | TXD0 | A29 |
| B30 | 3.3 DVDD | DGND | A30 |
| B31 | RX DV | TX EN | A31 |
| B32 | RX CLK | TX CLK | A32 |
| B33 | RX ERROR | TX ERROR | A33 |
| B34 | DGND | DGND | A34 |
| B35 | COL | CRS | A35 |
| B36 | DGND | DGND | A36 |
| B37 | IPB RDCLK | IPB TDCLK | A37 |
| B38 | reserved | IPB IN 1 | A38 |
| B39 | IPB OUT 0 | IPB IN 0 | A39 |
| B40 | DGND | DGND | A40 |
| B41 | IPB OUT 1 | reserved | A41 |
| B42 | 3.3 DVDD | RST | A42 |
| B43 | TDFRAME | RDFRAME | A43 |
| B44 | DGND | DGND | A44 |
| B45 | MDIO | MDC | A45 |
| B46 | RXD3 | TXD3 | A46 |
| B47 | RXD2 | TXD2 | A47 |
| B48 | RXD1 | TXD1 | A48 |
| B49 | RXD0 | TXD0 | A49 |
| B50 | 3.3 DVDD | DGND | A50 |
| B51 | RX DV | TX EN | A51 |
| B52 | RX CLK | TX CLK | A52 |
| B53 | RX ERROR | TX ERROR | A53 |
| B54 | DGND | DGND | A54 |
| B55 | COL | CRS | A55 |
| B56 | Reserved | Reserved | A56 |
| B57 | Reserved | Reserved | A57 |
| B58 | Reserved | Reserved | A58 |
| B59 | Reserved | Reserved | A59 |
| B60 | Reserved | Reserved | A60 |

AMC '97 52
USB 54
POWER
GROUND

ACR SERIAL BUS 56

Primary MII 62

IPB 64

Secondary MII/GPSI 68

Wireless/ Future 72

FIG. 5

| Signal Name | Type + | Pin/ Count* | Signal Description |
|---|---|---|---|
| | | | + Signal convention is from controller to riser |
| AC'97 | | 21 | |
| | | | |
| AC97_MSTRCLK[1] | I | B23 | 24.576 MHz master clock for AC '97 link |
| AC97_BITCLK | I/O | A23 | 12.288 MHz data clock from primary AC '97 CODEC |
| AC97_SYNC | I | A17 | Synchronization pulse from AC '97 controller |
| AC97_RESET# | I | B18 | Active low AC '97 reset signal |
| AC97_SDATA_OUT | I | B17 | AC '97 serial data from controller to CODEC |
| AC97_SDATA_IN0 | O | A21 | AC '97 serial data from primary AC '97 CODEC |
| AC97_SDATA_IN1 | O | A19 | AC '97 serial data from a second AC '97 CODEC |
| AC97_SDATA_IN2 | O | B21 | AC '97 serial data from a third AC '97 CODEC |
| AC97_SDATA_IN3 | O | B19 | AC '97 serial data from a fourth AC '97 CODEC |
| MONO PHONE[1] | O | A2 | Audio signal from CODEC to PC system audio |
| MONO_OUT/ PC_BEEP[1] | I | B3 | Signal from PC audio system to AC '97 CODEC |
| AUDIO PWRDN[1] | I | A1 | AC '97 CODEC low power control signal |
| AUDIO MUTE[1] | I | B1 | Mutes AC '97 CODEC |
| PRIMARY_DN# | I | B6 | Indicates presence or absence of motherhood CODEC |
| Reserved | N/A | 7 | B13, B14, A3, A4, A5, B4 and B5 |
| USB | | 4 | |
| | | | |
| USB_OC# | O | A8 | USB Bus over current signal |
| USB+ | I/O | A10 | Positive half of USB differential signal |
| USB- | I/O | A11 | Negative half of USB differential signal |
| S/P DIF IN | I | A13 | PCM audio or compressed AC-3 information |
| ACR Serial Bus | | 2 | |
| | | | |
| SCL | I | B24 | Serial bus clock |
| SDA | I/O | A24 | serial bus data |
| IPB | | 11 | |
| | | | |
| RST | O | A42 | Reset.Output to riser. Asynchronous. Active low. |
| TDFRAME | O | B43 | Output to riser. Flow control signal to a riser based device |
| RDFRAME | O | A43 | Input to IPB host controller. Flow control signal from a riser based device to the host controller |

FIG. 6A

| Signal Name | Type+ | Pin/Count* | Signal Description |
|---|---|---|---|
| MII (Primary) | | 18 | |
| TX_CLK | I | B33 | Transmit Clock |
| TX_DATA[3.0] | O | B31.29 B27.25 | Transmit Data |
| TX_ENABLE | O | B28 | Transmit Data Enable |
| TX_ERROR | O | B32 | Transmit data error |
| RX_CLK | I | A33 | Receive Clock |
| RX_DATA[3:0] | I | A31.29 A27.25 | Receive Data |
| RX_DV | I | A28 | Receive Data Valid |
| RX_ER | I | A32 | Receive Data Error |
| COL | I | B35 | Collision Detect |
| CRS | I | A35 | Carrier Sense |
| MDC | O | A26 | Management Data Clock |
| MDIO | I/O | B26 | Management Data I/O |
| | | | |
| MII (Secondary) | | 18 | This Section of the connector has an alternate GPSI function, described in Table 2 Secondary MII - Alternate Functions |
| TX_CLK | I | B53 | Transmit Clock |
| TX_DATA[3:0] | O | B51,49 B47,45 | Transmit Data |
| TX_ENABLE | O | B48 | Transmit Data Enable |
| TX_ERROR | O | B52 | Transmit data error |
| RX_CLK | I | A53 | Receive Clock |
| RX_DATA[3:0] | I | A51,49 A47,45 | Receive Data |
| RX_DV | I | A48 | Receive Data Valid |
| RX_ER | I | A52 | Receive Data Error |
| COL | I | B55 | Collision Detect |
| CRS | I | A55 | Carrier Sense |
| MDC | O | A46 | Management Data Clock |
| MDIO | I/O | B46 | Management Data I/O |
| | | | |
| Wireless | | 10 | |
| Reserved | N/A | | A56,A57,A58,A59,A60,B56,B57,B58,B59 and B60 |
| | | | |
| Power and Ground | | 36 | |
| +3.3 (DVDD) | | 5 | B15,B30,B34,B38,B50 3.3 volt digital voltage supply |
| +5 V | | B11 | 5 volt digital voltage supply |

Braces: 62 groups MII (Primary); 68 groups MII (Secondary); 72 groups Wireless.

FIG. 6B

| Signal Name | Type + | Pin/Count* | Signal Description |
|---|---|---|---|
| +12V | | B9 | +12 volt power supply |
| -12V | | B7 | -12 volt power supply |
| +3.3 dual/SB | | A15 | 3.3 Volt dual and VAUX voltage supply |
| +5 dual/SB | | A7 | 5 Volt dual and VAUX voltage supply |
| Audio GND | | B2 | Audio drive ground |
| AGND | | 3 | B8, B10, A6 Analog ground |
| SDO DGND | | A18 | Digital ground for AC '97 RESET, SYNC & SDATA_OUT |
| SDI_0/1 GND | | A20 | Digital ground for AC '97 SDATA_IN0 and 1 |
| SDI_2/3 GND | | B20 | Digital ground for AC '97 SDATA_IN2 and 3 |
| BIT GND | | A22 | Digital ground for AC '97 Bit Clock |
| DGND | | 18 | A9,B12,A12,A14,B16,A16,B22,A30,A34,A36,B36,A40,B40,A44,B44,A50,A54,B54 Digital ground |

FIG. 6C

MECHANICAL

| Parameter | Specification |
| --- | --- |
| Durability | 100 mating cycles without physical damage or exceeding low levels contact resistance requirement when mating with the card edge. |
| Mating Force | 6 oz. (1.7N) max average per matching contact pair using MIL-STD-1344, Method 2013.1 and gauge per MIL-C-21097 with profile as shown in ACR board specification. |
| Contact Normal Force | 75 grams minimum |

ELECTRICAL

| Parameter | Specification |
| --- | --- |
| Contact Resistance | (low level signal) 30 m$\Omega$ max. initial, 10m$\Omega$ max. increase through testing. Contact resistance test per MIL-STD-1344, Method 3002.1. |
| Insulation Resistance | 1000 M$\Omega$ min. per MIL STD 202, Method 302, Condition B. |
| Dielectric Withstand Voltage | 500 VAC RMS per MIL STD 1344, Method D3002.1 Condition 1. |
| Capacitance | 2 pf maximum @ 1MHz. |
| Current Rating | 1Amp, 30°C rise over ambient system temp. |
| Voltage Rating | 125VDC |
| Certification | UL Recognition and CSA Certification required. |

ENVIRONMENTAL

| Parameter | Specification |
| --- | --- |
| Operating Temperature | -40°C to 105°C |
| Thermal Shock | -55°C to 85°C 5 cycles per MIL STD 1344, Method 1003.1. |
| Flowing Mixed Gas Test | Battelle, Class II. Connector mated with board and tested per Battelle method. |

FIG. 8

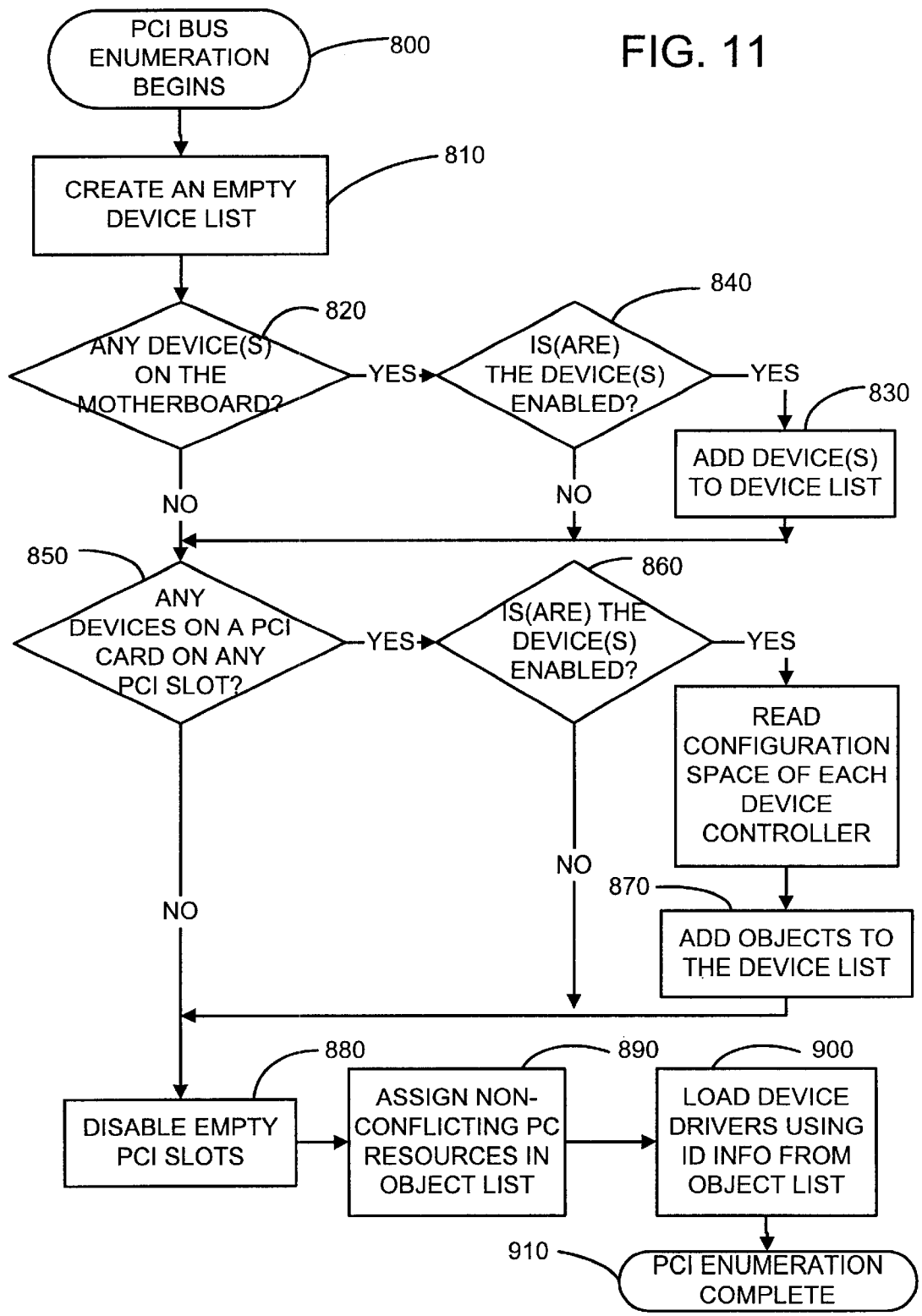

METHOD AND APPARATUS FOR INTERCONNECTING CIRCUIT CARDS

COPYRIGHT NOTICE AND AUTHORIZATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to a motherboard and removable circuit card architecture and interface for use in computer systems.

BACKGROUND OF THE INVENTION

Typically, a computer includes of a motherboard containing components, such as a main processor or central processing unit ("CPU"), memory, disk storage and other devices. These components normally transfer data to the CPU through a local data and address bus.

To provide additional functionality to one's computer, a user may plug a peripheral expansion card into one of a number of connectors or slots into the computer's motherboard. Additionally, one or more peripheral expansion cards may transfer data to the CPU through an external input/output ("I/O") bus via a connector on the motherboard. As a result, the CPU's external bus permits the computer to be expanded using a modular approach. For example, peripheral expansions of a computer may include adding a sound subsystem, a video subsystem, a communications subsystem, a compact disc ("CD") device, a storage device or hard drive, an instrumentation interface, or other special function expansions to the PC computer.

Typically, these peripheral expansion cards have pins on the edge of the card interfacing to a connector on the motherboard in order to provide electrical connections between the electronic circuits on the peripheral expansion card and the components, such as the CPU, on the motherboard. Then, the components can access these electrical circuits on the peripheral card via the CPU's external I/O bus. Further, each electrical connection on the external I/O bus typically provides a specific function. For example, one set of connections may provide the voltages required to power the peripheral expansion card (for example, +5, +12, and ground). Another group of connections might enable the data bus to transmit data between the CPU and the electronic circuits. A third group of contacts can provide the address bus in order to permit the device to be addressed through a set of I/O addresses. Finally, there may be contacts for control or other signals such as interrupts requests ("IRQ's"), direct memory access ("DMA") channels, and clock signals.

One of the earliest PC buses is named the "8-bit bus" (also known as the XT bus) because early PCs often had 8 bit processors like the Intel 8085 and 8088. This 8-bit bus has eight interrupts (of which six could be used by peripheral expansion cards), four DMA channels, a 62 pin connector and a CPU with a clock speed of 4.77 MHz. However, the installation of a peripheral expansion card requires manual configuration to utilize available computer resources such as DMA channels, IRQs, and I/O addresses. Additionally, each peripheral expansion card is separately configured in order to avoid a conflict with another device that utilizes the bus. Each card is configured for a particular computer by using jumpers and dual in-line package switches ("DIP") to operate with the computer according to instructions defined by the manufacturer.

The introduction of the IBM AT computer resulted in the development of a bus known as the Industry Standard Architecture ("ISA") bus. However, the ISA bus is a 16-bit bus because the IBM AT computer has a 16-bit processor such as the Intel 8086. The ISA bus is based on the "8-bit bus" connector with the addition of a small bus connector adding several signal lines to widen the data bus to 16-bits. In addition to the extra resources, the ISA bus is backward compatible with the older 8-bit bus. The ISA bus also adds eight more interrupts, additional data and address lines, and four additional DMA channels. Further yet, improvements over the XT bus include an increased clock speed of 8 MHz for the ISA bus with "Turbo" models running near 10 MHz. Additionally, the ISA bus is capable of "bus mastering" allowing a device on a peripheral card to take control of the bus to read or write directly from another device while the CPU is momentarily idled. As a result, bus mastering can greatly improve the data transfer performance of a computer.

Both the XT and AT bus typically operate at the same clock speed as the CPU, namely 4.77 MHz and 8 MHz, respectively. However, when newer CPUs outpaced the 8 MHz bus, such as with the early 12 MHz Intel '286 CPUs, the maximum speed of the bus limited the CPU clock speed. For instance, if the CPU clock is tied to the ISA bus having a clock speed of 8 MHz, then a faster CPU such as the 12 MHz Intel 286 CPU would be forced to operate at an 8 MHz CPU clock speed despite the '286 CPU's increased operating speed. Rather than force the '286 CPU to operate at a slower clock speed, one solution was to separate the '286 CPU clock from the I/O bus clock (i.e. 8 MHz), so that the '286 CPU could run at it's maximum speed (i.e. 12 MHz). Consequently, de-coupling the I/O bus from the 3286 CPU bus allows the I/O bus to operate at 8 MHz while the CPU clock may operate at 12 MHz.

As in the 8-bit bus however, the ISA bus may be configured using the same manual procedures for configuring the 8-bit expansion cards. As a result, resources such as interrupt memory addresses, DMA channels, and I/O ports are manually configured using jumpers and DIP switches. Alternatively, one special method of configuring an ISA bus expansion card is based on an ISA "Plug-and-Play" system. According to the ISA "Plug-and-Play" system, ISA cards may also be configured using an Electronically Erasable Programmable Read Only Memory ("EEPROM") chip on the card. Essentially, the jumper positions of the manual re-configuration method are programmed into the EEPROM and the settings could be made using a special software configuration program.

To operate properly, the ISA "Plug-and-Play" ("PnP") system is comprised of a standard ISA bus and a special set of Basic Input/Output System ("BIOS") extensions. In theory, these BIOS extensions examine the installed "Plug-and-Play" compatible cards at start up and set expansion cards to available resource settings. Despite intentions to make configuring an ISA card easy, the ISA "Plug-and-Play" method failed because the ISA "Plug-and-Play" enumeration algorithm was not widely accepted. As a result, conflicts between the CPU and the expansion card were frequent because the configuration system would not know about the existence of other non-PnP cards. Consequently, "Plug-and-Play" soon earned the nickname in the computer service industry as "Plug and Pray".

IBM later developed a bus using a higher density connector known as Micro-Channel Architecture ("MCA"). The MCA bus was available in either 16-bit or 32-bit versions and featured multiple bus mastering. Although the MCA bus clock speed was set at 10 MHz, the MCA allowed change configurations under software control rather than with jumpers and DIP switches. Consequently, a user can configure an MCA peripheral card to use available resources such as IRQ, DMA channel, memory address, and I/O ports using a reference disk and an option diskette after installing the physical device in the computer. The reference disk is a special bootable disk containing a program that sends commands to bus devices to configure their parameters. This reference disk is included with the computer and is unique to the particular MCA bus computer. Each MCA peripheral card also comes with an option disk containing the device specific configuration files for the device being installed. Nevertheless, computer systems designers do not extensively use the MCA bus because it is not backward compatible with the ISA bus.

The Extended Industry Standard Architecture ("EISA") open bus standard was developed by nine companies (Compaq, AST, Olivetti, Tandy, Hewlett-Packard, WYSE, Zenith, NEC and Epson) for defining a 32-bit software configurable EISA bus. According to the EISA standard, the peripheral expansion bus slots have both 32-bit finger and 16-bit slots to provide backward compatibility with ISA cards. However, as in the 8-bit bus, this bus is limited to an 8 MHz clock speed. Configuring an EISA bus is similar to configuring an MCA bus unless an ISA card is installed into an EISA slot. If an ISA card is installed, then the configuration procedure for an ISA card applies.

Once Pentium class 32-bit processors were introduced, the Peripheral Component Interconnect ("PCI") bus was developed to provide an interface bus that can match the speed of the Pentium microprocessor. PCI can support both 64-bit and 32-bit wide multiplexed address and data lines, so it can be used in both 486 and Pentium class systems. The PCI bus currently operates at up to 33 MHz with future versions operating up to 66 MHz.

The PCI bus is processor-independent because the external PCI bus transfers data to the local CPU bus through a special bridge circuit. The bridge circuit contains a memory controller and is connected to a cache and memory subsystems. Additionally, the bridge circuit may include data buffering/posting and PCI central functions such as arbitration. As a result, this provides the advantage of the bus being nearly universal with other computers because the PCI bus is compatible with a variety of personal computers, Mac OS based computers, and RISC type computers. The bridge circuit including the memory controller therefore allows PCI masters direct access to main memory. Additionally, the PCI bus can support multiple bus mastering expansion cards providing maximum bus throughput of up to 265 Mbps with 64 bit cards.

The PCI controller may perform arbitration using an access-based rather than a time-slot-based arbitration scheme. A bus master must arbitrate for each master access it performs on the bus. PCI may use a central arbitration scheme, where each master agent has a unique request and grant signal. A master agent may use a request-handshake to gain access to the bus.

The PCI bus and cards also provide some Plug-and-Play capabilities. PCI Plug-and-Play permits a programmatic enumeration, which automatically configures the PCI card for memory addressing, IRQ and DMA selection and I/O port addressing without having to move jumpers or DIP switches. When a new PCI card is installed and the computer is rebooted, the basic input/output ("BIOS") of the computer system should detect the newly installed device(s) and configure the computer resources such as memory, IRQ, I/O, and DMA settings without human intervention. Additionally, when the operating system detects the insertion of a new device, it installs the proper software so that the computer can use that motherboard or PCI card.

Yet another standard known as the Audio/Modem Riser ("AMR") specification defines an open industry-standard interface connector and mechanical form factor for adding a modem and audio riser card to ATX, micro ATX, and NLX circuit board form factors. Sensitive analog components are placed on a riser card in order to provide high quality audio and also easier modem homologation. The AMR interface provides support for Audio Codec ("AC"), Modem Codec ("MC") and Audio/Modem Codec ("AMC") devices. However, the AMR Specification does not define an aftermarket I/O standard expansion slot. Instead, the AMR specification only defines a system manufacturer, motherboard-only, riser interface that is intended to be fully configured prior to the initial shipment of the system. Nevertheless, the PCI bus standard typically serves as the aftermarket I/O interface. The document entitled "Audio/Modem Riser Specification", by Intel Corporation, provides additional details on the AMR specification.

The AMR standard, however, was intended for conventional modem devices and does not accommodate today's high bandwidth communication devices. Computers today routinely take advantage of the expanding broadband network by utilizing digital subscriber lines, cable modems, and home networking technology. Needed is a system that allows greater scalability and expandability by integrating high bandwidth communication devices on a peripheral card. Moreover, needed is a system that can discover, identify and assign peripheral devices added to a computer system while arbitrating conflicts between devices.

SUMMARY OF THE INVENTION

Addressing some of the problems with systems utilizing peripherals or expansion cards as described above, the present embodiments provide the ability to support expansion card based broadband communications, networking peripheral and audio subsystem designs on one expansion card connected to a computer system motherboard. By supporting multiple peripheral devices on an expansion card, bus slots on the system motherboard can be freed up for use by other peripheral or expansion devices. Moreover, utilizing the present embodiments, printed circuit board area and cost of adapter cards can be reduced. The exemplary embodiments disclose a system and method capable of providing for a more forward approach in motherboard and removable expansion card architecture.

In an aspect of the present invention, a method for discovering devices on a peripheral card removable from the motherboard includes accessing information from a storage device located on the peripheral card. From the accessed information, a device list can be generated and utilized to program at least one appropriate controller on the motherboard with configuration parameters from the device list.

In another aspect of the present invention, a computer system includes a motherboard having a set of programmable device controllers, a bus system, and an expansion card having a set of peripheral devices. The bus system connects the set of controllers located on the motherboard to the peripheral devices located on the expansion card. At startup, a basic input/output system on the motherboard requests information relating to the peripheral devices. The information relating to the set of peripheral devices is then transmitted from a storage device located on the expansion card to the basic input/output system for distribution to the appropriate controllers.

In yet another aspect of the present invention, an expansion card contains a set of peripheral devices and a storage unit. The storage unit identifies the expansion card and the peripheral devices included on the card. In the exemplary embodiment, the storage unit contains enumeration and configuration data for the expansion card and the peripheral devices located on the card.

According to another aspect of the present invention, a motherboard includes a set of controllers including a serial bus controller, an advanced communication riser ("ACR") connector, and a basic input/output system. The set of controllers are in communication with the ACR connector. The basic input/output system is in communication with the serial bus controller. In the exemplary embodiment, the basic input/output system obtains information relating to peripheral devices on an attached expansion card from the expansion card via the serial bus controller, and programs the information onto each of the other controllers.

In yet another aspect of the present invention, a method for saving printed board area and cost of adapter cards includes utilizing a multi-functional bus system. In the exemplary embodiment, the multi-functional bus system including an edge pin connector is configured such that the edge pin connector located on a peripheral card does not necessarily have to be as large as the full length of a connector located on a motherboard. Moreover, with careful grouping of the pins on the edge pin connector, the size of peripheral card can vary to achieve a desired card length and width. Thus, the peripheral card does not need to waste unnecessary printed board area and costly adapter cards.

The present embodiment provides many different uses and advantages. For example, the present embodiments provide a flexible method of discovering and integrating plug-and-play peripheral devices. The present embodiments provide an enumeration process to enable new devices to be discovered and assigned the appropriate device parameters and drivers without conflict with existing devices such as devices on other peripheral cards as well as motherboard-based devices. BIOS entry points can also be created to allow software programs to access and utilize the device parameters. The embodiments herein are also backward compatible with existing AMR standard systems and can provide a standard interface for future communication devices.

The present embodiments also save circuit board space on peripheral cards enabling reduced sized peripheral cards when connector pin outs are advantageously assigned as described herein. Multiple and diverse communication devices such as network interfaces, DSL and wireless interfaces, can be accommodated on a single, scalable circuit card saving board space and PCI slots. Due to the scalable architecture, future extensions and expansion can be added to existing systems.

The foregoing and other objects, features and advantages of the system and method for improving motherboard and removable circuit card architecture will be apparent from the following more particular description of preferred embodiments of the system and the method as illustrated in the accompanying drawings.

BRIEF DESCRIPTION OF THE DRAWINGS

FIGS. 3A–3E illustrates in further detail the data structure of the storage device of the expansion card of FIG. 1;

FIG. 5 illustrates a table showing an exemplary grouping of bus signals and pin locations of the ACR connector;

FIGS. 6A–6C illustrate a table showing an exemplary signal description for each of the signals in the table of FIG. 2 as viewed from the expansion card of FIG. 1;

FIG. 8 illustrates the ACR connector suggested mechanical, electrical, and environmental performance requirements;

FIG. 11 illustrates an exemplary flow chart of the PCI enumeration.

DETAILED DESCRIPTION

The system and method disclosed herein provides a form factor and interface system for supporting multiple and varied communications and audio subsystem designs for use on a personal computer ("PC"). The system and method are implemented on a motherboard and expansion card architecture that can support modem, audio, Local Area network ("LAN"), Wide Area Network ("WAN"), and Digital Subscriber Line ("DSL") technology. It should be understood that the present embodiments are not limited to the described exemplary embodiments disclosed herein, but that they may also be implemented in systems that utilize peripheral devices or expansion cards for further function and flexibility. Therefore, details regarding the personal computer including the motherboard and expansion card are provided as an example, and are not necessary to the invention.

The system and method are implemented on a motherboard and expansion card architecture for PCs, and preferably maintain backward compatibility with the Audio/Modem Riser ("AMR") specification through an industry standard connector such as a 120-pin peripheral component interconnect ("PCI") connector. The AMR specification is fully incorporated by reference herein.

To maintain backward compatibility with the AMR specification, the advanced communication riser ("ACR") connector utilizes a 120 pin PCI connector that is reversed and offset from the connector layout of the AMR specification. The AMR connector pins preferably remain unchanged from the AMR specification to further enable AMR compatibility. Therefore, according to the described embodiment, an AMR riser may be plugged into the ACR connector located on a system that utilizes the disclosed embodiments and function correctly.

Figure 1:
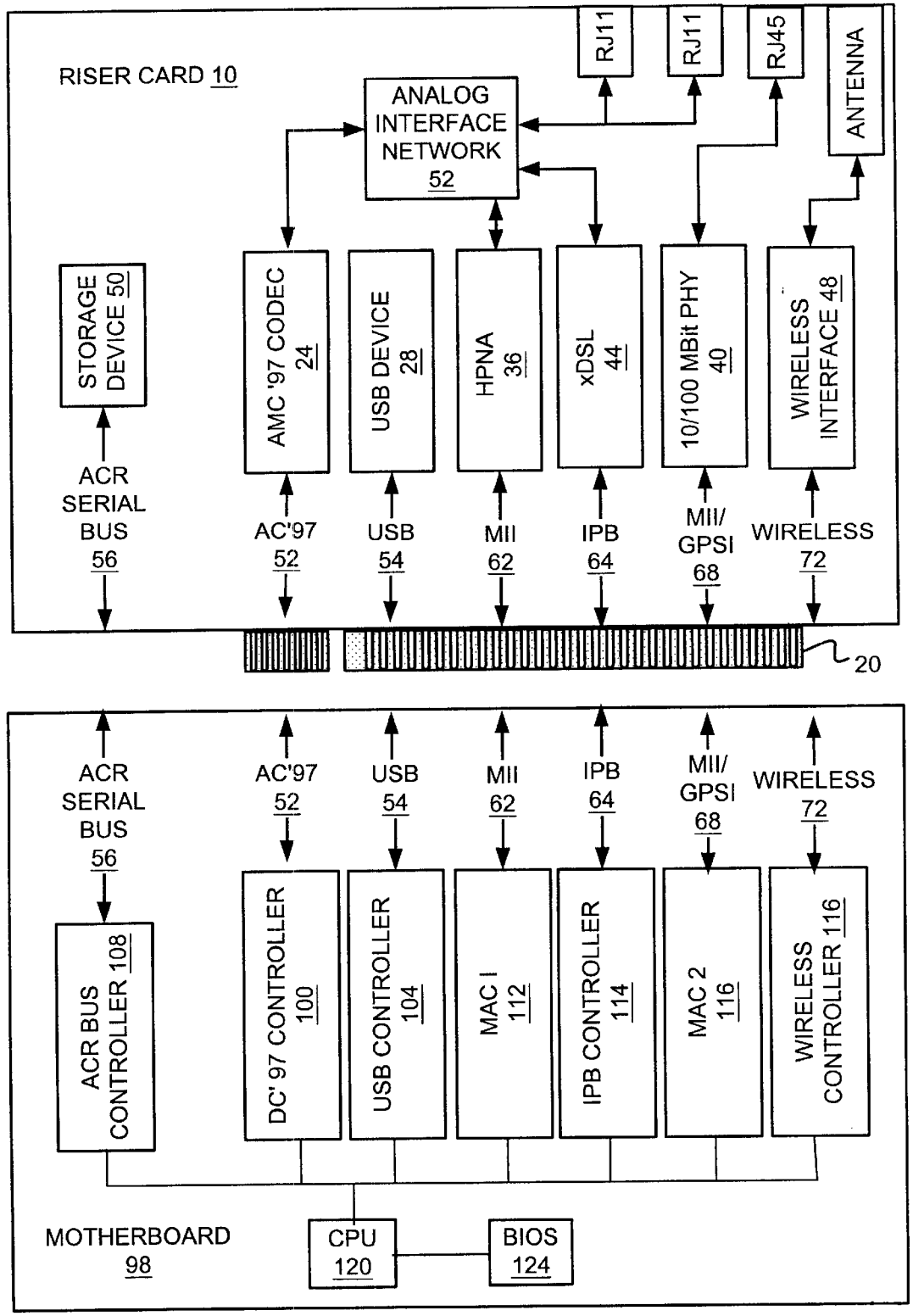
FIG. 1 illustrates a block diagram of the motherboard and expansion card architecture of an exemplary embodiment.

FIG. 1 illustrates a block diagram of an exemplary removable circuit card, hereinafter referred to as a riser card 10, and PC motherboard 98 architecture. The riser card 10 can include a printed circuit board or adapter that plugs into the motherboard 98 via the ACR connector 20 to provide increased functionality such as LAN/WAN connectivity, as well as audio subsystems, etc. The riser card 10 can utilize an ACR connector 20 that includes a standard 120-pin connector 20 to maintain backward compatibility with current AMR designs. The riser card 10 can generally include peripheral devices such as an AMC'97 Codec 24, and Universal Serial Bus ("USB") device 28 or USB connector. The riser card 10 also includes a storage device 50.

Additional peripheral devices can also be placed on the riser card 10 such as a physical ("PHY") layer for a home networking device 36 (e.g., HomePNA), Ethernet 40 (e.g., 10/100 Mbit PHY), xDSL device 44, or wireless interface 48. It should be understood that the riser card 10 is not limited to using only the described peripheral devices, but can use other types of peripheral deices to provide further functionality to the motherboard 98.

The peripheral devices 24–48 may also utilize additional circuitry on the riser card 10. For example, according to this described embodiment, the AMC'97 CODEC 24, HPNA 36 and the xDSL 44 are shown in connection with a RJ11 jack via the analog interface network 52. Furthermore, the 10/100 Mbit PHY 40 is in connection with an RF45 jack. The wireless interface 48 is shown linked to antenna.

To accommodate the peripheral devices on the riser card 10, hard-wired lines (e.g., electrical or optical conductors) can be used for transferring data between the peripheral devices 24–48 and their respective controllers 100–120. These hardware lines, or buses, can include an AC'97 52, USB 54, ACR Serial Bus 56, Primary MII 62, Integrated Packet Bus ("IPB") 64, secondary MII-MII/GPSI 68, and wireless bus 72. Each bus can preferably transmit data to and from each of the active peripheral devices 24–48 to their appropriate controller 100–120, preferably located off of the riser card 10 as described with respect to the motherboard 98 below.

Referring again to FIG. 1, the exemplary motherboard 98 can support LAN/WAN connectivity as well as audio subsystems from the riser card 10. The motherboard 98 can include the main circuit board that generally contains the primary components of the computer, such as the CPU 122, BIOS 124, main memory, and support circuitry, and so forth. The CPU 122 and BIOS 124 are shown in the block diagram.

The BIOS 124 assists the CPU 122 by including a set of hardware or software routines that can test motherboard 98 hardware at startup, start the operating system, and support the transfer of data among hardware devices on the motherboard 98 and riser card 10. The BIOS 124 can be stored in ROM on the CPU 124, and is executed when the computer is turned on or reset. It should be understood that the BIOS 124 may support more than one riser card 10 attached to the motherboard 98 at any one time, if desired.

The motherboard 98 can also contain a set of controllers 100–120 for controlling peripheral devices 24–48 on the riser card 10. In this exemplary embodiment, the controllers 100–120 are shown linked to a bus such as a peripheral component interconnect ("PCI") bus 128. Each of the controllers 100–120 are preferably configured from the enumeration and configuration data received from the storage device 50 on the riser card 10. The controllers 100–120 can include a DC'97 100, USB 104, serial bus controller 108, other desirable controllers such as general purpose MAC controllers, labeled MAC 1 108 and MAC 2 112, Integrated Packet Bus ("IPB") controller 114, and a wireless controller 120. The controllers 100–120 preferably each have a configuration register to identify and assign the controller to a peripheral device such as a device on the riser card 10 or the motherboard 98. The configuration register is a programmable memory space, and is programmed to store enumeration and configuration data for the device that the controller is assigned. The configuration spaces are programmed by the BIOS 124 for use with appropriate peripheral devices 24–48 or devices on the motherboard 48.

Therefore, according to this described embodiment, the following buses are configured to transmit data between the controllers 100–120 and their respective peripheral devices 24–48. The AC'97 bus 52 links DC'97 controller 100 with AMC'97 CODEC 24. The AMC'97 CODEC 24 is also shown linked to an RJ11 jack via the analog interface network 58. The USB bus 54 links USB controller 104 with USB device or connector 28. The ACR serial bus 56 links serial bus controller 108 with storage device 50. The MII bus 62 links MAC 1 112 with HPNA PHY 36. The HPNA PHY 36 is also shown linked to an RJ11 jack via the analog network interface 58. The IPB bus 64 links IPB controller 114 with xDSL device 44. The xDSL device 44 is also shown linked to an RJ11 jack via the analog network interface 58. The MII/GPSI bus 68 links MAC 2 116 with 10/100 Mb PHY 40. The 10/100 Mb PHY is also shown linked to an RJ45 connector. The wireless bus 72 links wireless controller 120 with 10/100 Mbit wireless interface 48.

Preferably, the storage device 50 located on the riser card 10 holds enumeration and configuration data. The storage device 50 is preferably in communication with an serial bus controller 108 located on the motherboard 98 via the ACR serial bus 56. The storage device 50 can be implemented in any technology, but shall appear to the ACR bus controller 108, and other devices on the same ACR serial bus 56, as a 24xx-class serial electrically erasable programmable read-only memory ("EEPROM") device.

The enumeration and configuration data stored in the storage device 50 identifies the peripheral devices 24–48 located on the riser card 10. The storage device 50 can optionally contain a description of the riser card 10 itself for completeness or a description of any vendor-defined data if access to the vendor-defined area is desired.

Figure 2:
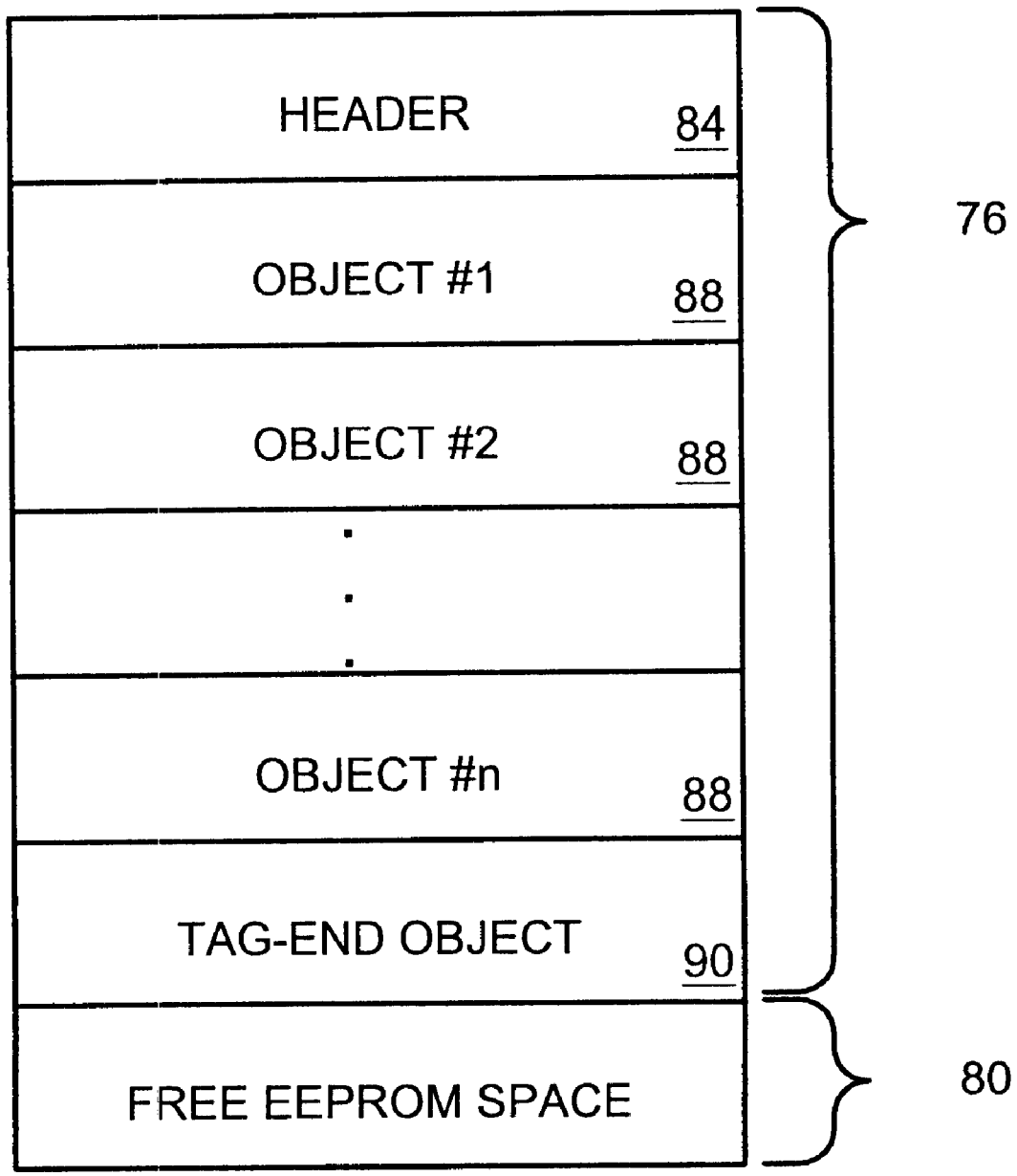
FIG. 2 illustrates an exemplary embodiment of the data structure of the expansion card of FIG. 1.

Referring to FIG. 2, the storage device 50 preferably contains two units of memory, namely an enumeration unit 76 and a vendor defined unit 80. The enumeration unit 76 is a variable sized area that stores the enumeration data for the peripheral devices 24–48 located on the riser card 10. Preferably, this enumeration unit 76 is programmed by the manufacturer of the riser card 10 to ensure that the enumeration data accurately reflects the peripheral devices 24–48 and accurate. The enumeration area 76 contains a header 84 followed by a list of the peripheral devices 24–48 present on the riser card 10, and are correspondingly represented by an enumeration object 88. The enumeration objects 88 end at a tag-end object 90. For example, according to the described embodiment, an enumeration object 88 that describes the riser card 10 itself may contain the riser card name, manufacturer identification, serial number, and power consumption information.

Thus, the storage device 50 may contain enumeration data for the riser card 10 itself and all of the peripheral devices 24–48 located on the riser card 10. Additionally, the storage device 50, if so desired, can contain the size of the memory on the storage device 50, the allocation of data, and a checksum for self-testing. Consequently, if an enumeration entry exists, the entry preferably matches the physical and logical characteristics of the storage device 50.

Further, the storage device 50 may provide access to the vendor defined unit 80 for providing device peripheral device 24–48 specific information often useful in enumeration. For example, the storage device 50 may specify the address location for a vendor defined unit 80.

FIGS. 3A–3E illustrates in further detail the data structure of the storage device of FIG. 2. The data structure in the peripheral device list preferably represents the hardware present of the riser card 10. The information in the data structure can be used by a basic input/output system ("BIOS") to program controllers corresponding to the peripheral devices 24–48 on the riser card 10, as described below. Additionally, the information in the data structure can be made accessible to software on the motherboard 98 via BIOS calls or BIOS entry points.

A BIOS entry point allows an application or driver to access device information via an Application Programming Interface ("API"). An API is a set of standard software interrupts, calls, and data formats that an application program uses to initiate contact with another service, such as the BIOS 124. In one embodiment, the BIOS 124 may support two distinct entry points. A real mode interface, for example, may be evoked via INT 1AH and a 32-bit protected mode mechanism to allow access for ring zero device drivers. Some controllers 100–120 may require initialization by the BIOS 124 during the boot procedure. Such initialization may preferably take place either after the PCI enumeration is accomplished or temporary resources may be assigned to permit initialization at any time. Probably the most convenient time to carry out any multi-function bus related initialization is before PCI enumeration. By then all existing devices have PCI controllers with the correct identification and permanent resources can then be assigned. Additionally, all non-existent devices may be turned off.

The peripheral device list preferably contains a header followed by a list of object descriptors. Each object descriptor is itself a list of items associated with that object. The nature of the items can depend on the object's functions, the bus it uses, and the purpose of the information. The last object descriptor in the peripheral device list is an END object to indicate the end of the device list and carry the global checksum.

FIG. 3A shows the peripheral device list header, which is shown starting at memory address zero, and is composed of four bytes. The header preferably allows quick identification of the riser card 10 to make aware that the riser card 10 is an ACR compatible riser card 10.

FIG. 3B shows an exemplary object or object descriptor, which is a self-contained packet of information. Each object preferably contains an object header byte, one object size byte, an optional object size extension byte. These bytes are then followed by the object's data of variable size. Each object descriptor contains zero or more data items. The data items can carry the various kinds of information such as peripheral device identification, serial numbers, and so forth. Data items can be arranged inside an object in any sequence, but the BIOS preferably executes them in the sequence that they appear.

FIG. 3C shows an exemplary object byte header and the values as they are defined for the tag and bus fields. The object byte header includes a tag field of 4 bytes and a bus field of 4 bytes. The values defined for the tag field shown correspond to a particular peripheral device 24–48. The values defined for the bus field shown correspond to a particular bus 52–72 that is used to connect the appropriate peripheral device 24–48 to controller 100–116. Therefore, according to the values defined for the tag field, a value of 3 in the tag field would represent a TAG_SOUND, which refers to a sound device. In the bus field corresponding to the BUS_ACLINK, a value of 1 might be found indicating that the sound device should utilize the AC-Link bus.

FIG. 3D shows an exemplary object size byte and the values as they are defined for the Mobo, Long, and Len fields. The Mobo field specifies the location of the device, such the device is located on the motherboard or the device is a peripheral device located on a riser card. The Long field describes the contents of the Len field such as a zero if the Len field contains the number of bytes in the object descriptor or a one if the Len field contains the 6 most significant bits of a 14-bit len. The len is the size or length of the object descriptor.

FIG. 3E shows an exemplary tag-end object to signal that the end of the object list in the storage device 50 and can provide a checksum for the entire enumeration area. The end object may include the checksum such as the sum of the bytes in the enumeration area should add up to 0FFh (0FF in hexadecimal).

Objects are followed by optional data items. Each data item describes a characteristic of the object. The BIOS must process data items in the order that they are encountered in each object descriptor. When a BIOS client requests the ACR enumeration data, the data items will be presented in the same order that they appear in the original source (ROM BIOS or EEPROM).

Data items are composed of a header containing the Item and Isize fields, followed by the item payload. In some cases, the Item and Isize fields are omitted. The Item field specifies the meaning of the information in the payload, while Isize specifies the size of the data payload. The data values must immediately follow the header, and if present, the size extension byte. More details regarding the data item format are given in Appendix-Data Storage.

In the exemplary embodiment, an object can be executed during the configuration phase. The object preferably carriers optional, real mode 16-bit x86 code. This code is preferably called in real mode by the BIOS once per system power up or reset sequence. Preferably, the code in the executable object is relocatable. The BIOS can then copy the code to a paragraph boundary and perform a far call to the first byte with parameters set as follows:

CS:IP: Set to the 1st byte of the code in the executable object.

DS:SI: Points to the beginning of the fully prepared device list in memory.

ES:DI: Points to a 32 byte table containing the PCI handle for each controller.

SS:SP: Points to the stack area, with at least 1k bytes of free stack space for use by the executable object.

Further, the direction flag is preferably set to UP via CLD instruction.

Upon termination, the executable object preferably executes a far return instruction. Furthermore, the PCI handle table can contain the PCI handles for each controller on the motherboard 98. If a controller does not exist in the hardware for a specific bus, its PCI handle entry can be set to 0FFFFh. The table can contain one 16-bit entry for each of the controllers in the order defined by the bus field or the object header byte. However, for the AC-Link there are preferably two controllers defined for the AC-Link, a modem controller and a sound controller.

The exemplary program below illustrates an example of the BIOS code utilized to invoke an exemplary executable object:

```
; Assumes that DS:SI points to the 1st byte of the
    executable object code,
; and CX contains the number of bytes in the executable
    object (from the
; object header)
    EXEC:Mov ax,4000h; Point to free RAM
    Mov es,ax; set segment
    Mov di,0000h; good location
    Cld; clear direction flag
    Rep movsb; move code over safe area
    Mov si, offset DevList; pointer to device list (DS must
       OK)
    Les di,AdrOfPciHandles; pointer to PCI handle table
    Pusha; save registers if needed
    Call fat 4000h:0; call executable object
    Popa; restore registers
    . . . ; keep going
```

Enumeration information, however, is not required to be stored in an EEPROM type of storage device 50. One skilled in the art may readily implement other devices such as non-volatile memory ("NVRAM"), flash memory, programmable array, read only memory ("ROM"), random access memory ("RAM"), a hard drive, bubble memory, or any other suitable storage device. The term storage device will be used throughout this specification to refer to a generalized storage device without limiting the invention to any particular type of storage device. The storage device capacity can vary according to the desired amount of information that is stored for each particular peripheral device 24–48 or application.

Figure 4:
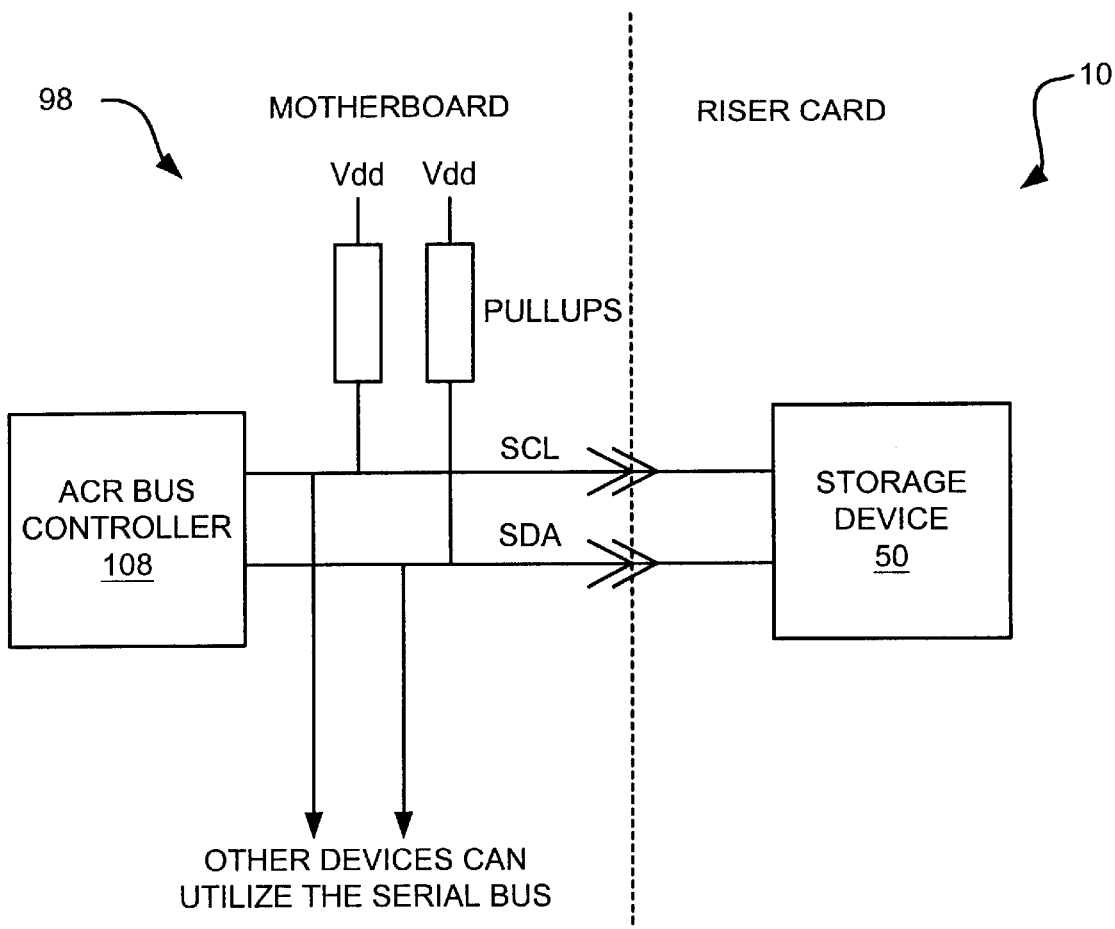
FIG. 4 illustrates the bus topology of an exemplary bus interconnecting the motherboard and expansion card of FIG. 1.

FIG. 4 illustrates the topology of an exemplary ACR serial bus 56 utilized by the motherboard 98 riser 10 architecture of FIG. 1. The ACR serial bus 56 can allow an ACR bus controller 108, preferably located on the motherboard 98, to read enumeration and configuration data from the storage device 50, preferably located on the riser card 10. The ACR serial bus 56 may include a two-wire serial bus based upon the I$^2$C protocol for communication with the storage device 50. The I$^2$C protocol may support the Byte Write, Page Write, Current Address Read, Random Byte Read, and Sequential Read protocols as defined in the Microchip Technology Inc. 24LC02B datasheet, document number DS20071J the controls of which are incorporated herein by reference. The ACR serial bus 56 may also connect to other peripheral devices 24–48 located on the riser card 10.

The ACR bus controller 108 and storage device 50 communicate over the ACR serial bus 56. The ACR serial bus 56, as described above, preferably utilizes I$^2$C protocol and allows the BIOS 124 to generate I$^2$C transactions on the ACR serial bus 56. The I$^2$C protocol utilizes two signals, the serial clock line ("SCL") and the serial data line ("SDL"). As such, the ACR bus controller 108 is an I$^2$C master. The motherboard 98 preferably supplies any pull-up devices.

The ACR bus controller 108 can be located on the motherboard 98, and may include a System Management Bus ("SMBus") controller. Alternatively, a General Purpose Input/Output ("GPIO") controller, or any other applicable serial bus controller, as known in the art, may be used to function as the ACR bus host controller 108.

In another embodiment, the controller 100–120 functions can be integrated on a single bus controller (not shown). Integrating controllers onto a single bus controller on the motherboard 98 can also be more efficient and less costly. The single bus controller may have the capacity to perform multiple or all controller functions, the cost to integrate multiple controllers into a single controller is less than the cost of implementing multiple, distributed controllers 100–120. Additionally, the cost and space requirements of a riser card 10 is further reduced because the controllers 100–120 are not required to be provided on the peripheral card, rather the controller 100–120 are provided on the motherboard 98. Further, other bus standards, either mentioned herein, known to those skilled in the art, or those developed in the future can be applied to this bus controller integration scheme.

FIG. 5 illustrates a table showing an exemplary grouping of bus signals and pin locations of the ACR connector 20 that connects the peripheral devices 24–48 to their appropriate controller 100–120. As described above, the buses can include an AC'97 52, USB 54, ACR Serial Bus 56, Primary MII 62, Integrated Packet Bus ("IPB") 64, secondary MII-MII/GPSI 68, and a wireless communication 72. In this exemplary grouping of signals, the AC'97 52 bus and USB 54 utilize A1–A23 and B1–B23 pin locations. The ACR serial bus 56 utilizes pin location B24 and A24 for the serial clock line ("SCL") and the serial data line ("SDL") respectively (SCL and SDL are described below). The primary MII 62 utilizes pin locations A25–A35 and B25–B35; IPB 64 utilizes A36–A44 and B36–B44; secondary MII/GPSI utilizes A45–A55 and B45–B55; and wireless 72 or reserved pin locations utilizes A56–A60 and B56–B60. A keyway to ensure the proper signals are connected by limiting the ACR connector to fit a certain way is placed between pins A11, A12 and B11, B12.

FIGS. 6A–6C illustrate a table showing an exemplary signal description for each of the signals in FIG. 5 as viewed from the riser card 10. The table includes the signal name, type of signal (input or output), pin count, and description. For example, according to this table, signal AC97_SDATA_OUT is an input at pin B17 and the signal is AC'97 serial data received from the DC'97 controller 100 and input into the AC'97 Codec 24. Furthermore, the ACR serial bus 56 utilizes pins B24 and A24 for the SCL and SDA respectively. The signal SCL is an input into the storage device 50 and is a serial bus clock, whereas the signal SDA is both an input and output bus to transport data serially to and from the storage device 50. Nevertheless, the bus signals given in FIGS. 5 and 6A–6C can be used to connect the peripheral devices 24–48 to their appropriate controller 100–120.

Figure 7:
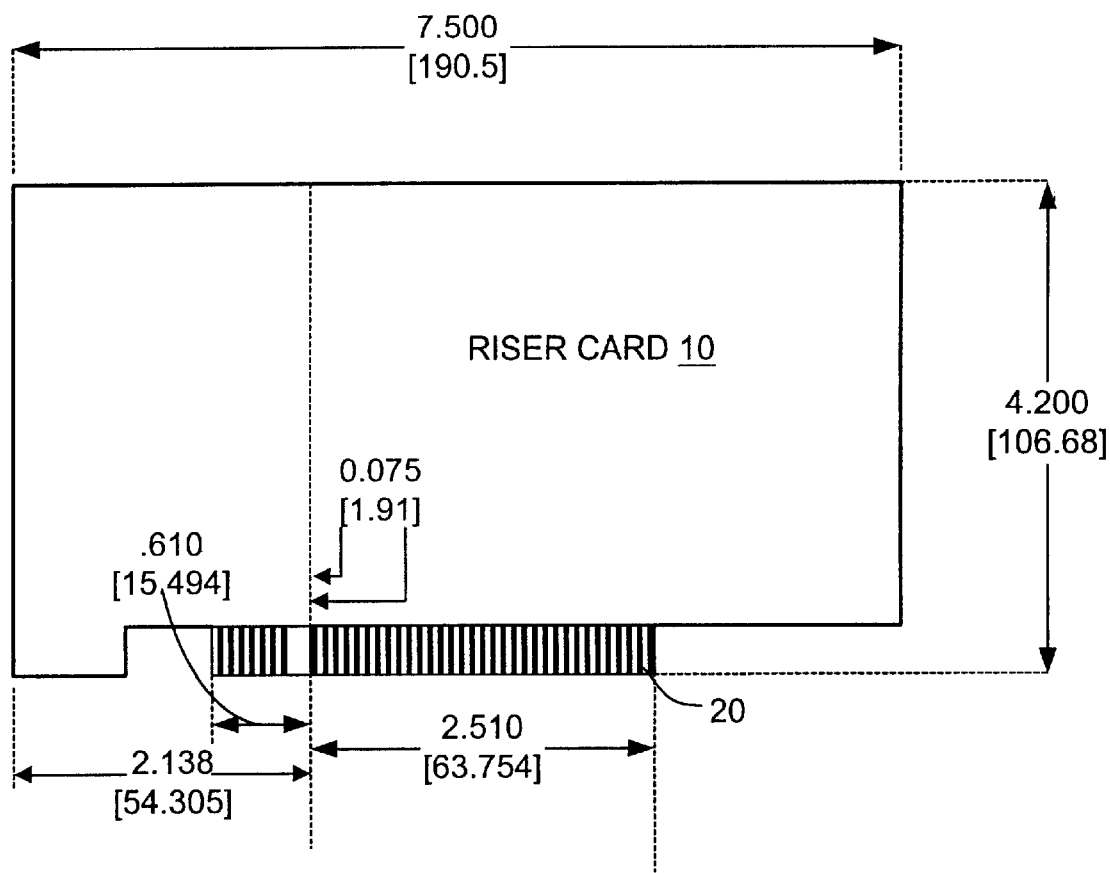
FIG. 7 illustrates an exemplary physical view of the expansion card and ACR connector of FIG. 1.

FIG. 7 illustrates an exemplary physical view of the riser card 10 and ACR connector 20. The exemplary view of the riser card 10 does not show peripheral devices 24–48, but shows a surface of the riser card 10 that the peripheral devices 24–48 may be located on. The length of the riser card 10 should not exceed 7.500 inches (190.5 millimeters) and the height should not exceed 4.200 inches (106.68 millimeters). When peripheral devices 24–48 are placed on the riser card 10, the maximum height of the devices 24–48 on the primary component side of the riser card 10 should not exceed 0.570 inches, and the devices 24–48 on the backside of the riser card 10 should not exceed 0.105 inches. Other measurements are shown by way of example and should not be limited to such. The ACR connector 20 preferably includes the buses 52–72 for connecting the peripheral devices 24–48 to their appropriate controllers 100–120.

In the exemplary embodiment, the ACR connector 20 includes a multi-functional bus system having an edge pin connector to communicate information between the riser card 10 and the motherboard 98. Preferably, the multi-functional bus is configured such that the edge pin connector on the riser card 10 is not required to fill the entire slot or connector located on the motherboard 98. Consequently, the riser card 10 can vary in size, needing only to accommodate the peripheral devices located on the riser card 10. For example, according the exemplary embodiment, if the riser card 10 has only a USB device and the storage device. Then the edge pin connector might need pins for power, ground, serial bus to accommodate the storage device, and a USB bus to accommodate the USB device . As a result of the small multi-functional bus system, the edge pin connector of the riser card 10 is not necessarily required to access unused pins on the slot or connector of the motherboard 98.

The multi-functional bus system preferably including an edge pin connector organizes and groups the pins such as according to pin functionality or needed pins. For example, according the above described embodiment (i.e., a riser card 10 generally having only a USB device and storage device), pins located on the edge pin connector could be organized by power, ground, serial bus to accommodate the USB device, and a serial bus to accommodate the storage device. By placing the pins according to pin functionality or needed pins, the edge pin connector does not need to include unnecessary pins. It should be understood that the multi-functional bus system is not limited to use on an ACR compatible riser card 10, but can be utilized in any type of computer utilizing expansion or peripheral cards.

FIG. 8 illustrates the ACR connector 20 suggested mechanical, electrical, and environmental performance requirements. Such parameters utilized in characterizing the performance requirements are durability, mating force, and contact normal force for mechanical; contact resistance, insulation resistance, dielectric withstand voltage, capacitance, current rating, voltage rating, and certification for electrical; operating temperature, thermal shock, and flowing mixed gas test for environmental.

ACR enumeration includes determining the peripheral devices 24–48 present on the riser card 10, allocating non-conflicting PC resources to the controllers 100–120, and then configuring the controllers 100–120 to access the allocated peripheral devices 24–48. After ACR enumeration, a PC utilizing the ACR serial bus 56 may consider a riser card 10 as an extension of the motherboard 98. As a result, the BIOS 124 may have knowledge of the riser card 10 capability supported on the motherboard 98. Consequently, the BIOS 124 may have appropriate routines to insure that all peripheral devices 24–48 are properly configured for ACR enumeration to occur.

ACR enumeration may be performed on a riser card 10, the peripheral devices 24–48 identified on-board the riser card 10, the operating system, devices on the motherboard 98, and the software device drivers for the purpose of identifying themselves. Additionally, the identification of these devices ensure that a conflict between computer resources or devices does not occur. ACR Enumeration further ensures that the operating parameters for the devices are correctly set by the BIOS 124, that the correct set of drivers are loaded by the operating system, and that any additional vendor-defined information is available to the device driver. Perferably ACR enumeration maintains compatibility with the Microsoft Windows operating system, or with other operating systems, such as Linux, Unix, Solaris, Macintosh OS, Palm OS, or any other computer operating system.

Operating systems, including BIOS 124 have improved dramatically in their ability to use standardized register space to uniquely identify hardware added to a system and to install the appropriate driver(s) for the newly installed hardware. The PCI standard uses registers defined as Vendor ID ("VID"), Device ID ("DID"), Subsystem Vendor ID ("SVID"), and Subsystem ID ("SID"). The VID and the DID may be hardwired with the PCI card for each function implemented. Analog type devices such as AMR devices, however, may be supplied by different vendors. Consequently, each analog type device implementing the AMR functions differently. Therefore, the SVID and SID may be assigned on a case by case basis during enumeration. As a result, ACR enumeration information may be provided to the operating system using a combination of storage device 50 and specialized BIOS 124 routines.

A riser card 10 may utilize several different combinations of interfaces. To prevent resource conflicts, the BIOS 124 is preferably responsible for making sure that the resources from the motherboard 98 are supplied to the interfaces in order to support the feature set on the riser card 10. Therefore, during enumeration, the BIOS 124 may determine the interfaces required by the riser card 10. Once the BIOS determines the required interfaces, then they may identify the supported functions of the riser card 10. Any discrepancies between the riser card 10 and the motherboard 98 interfaces may be communicated to the user through a displayed warning message.

Figure 9:
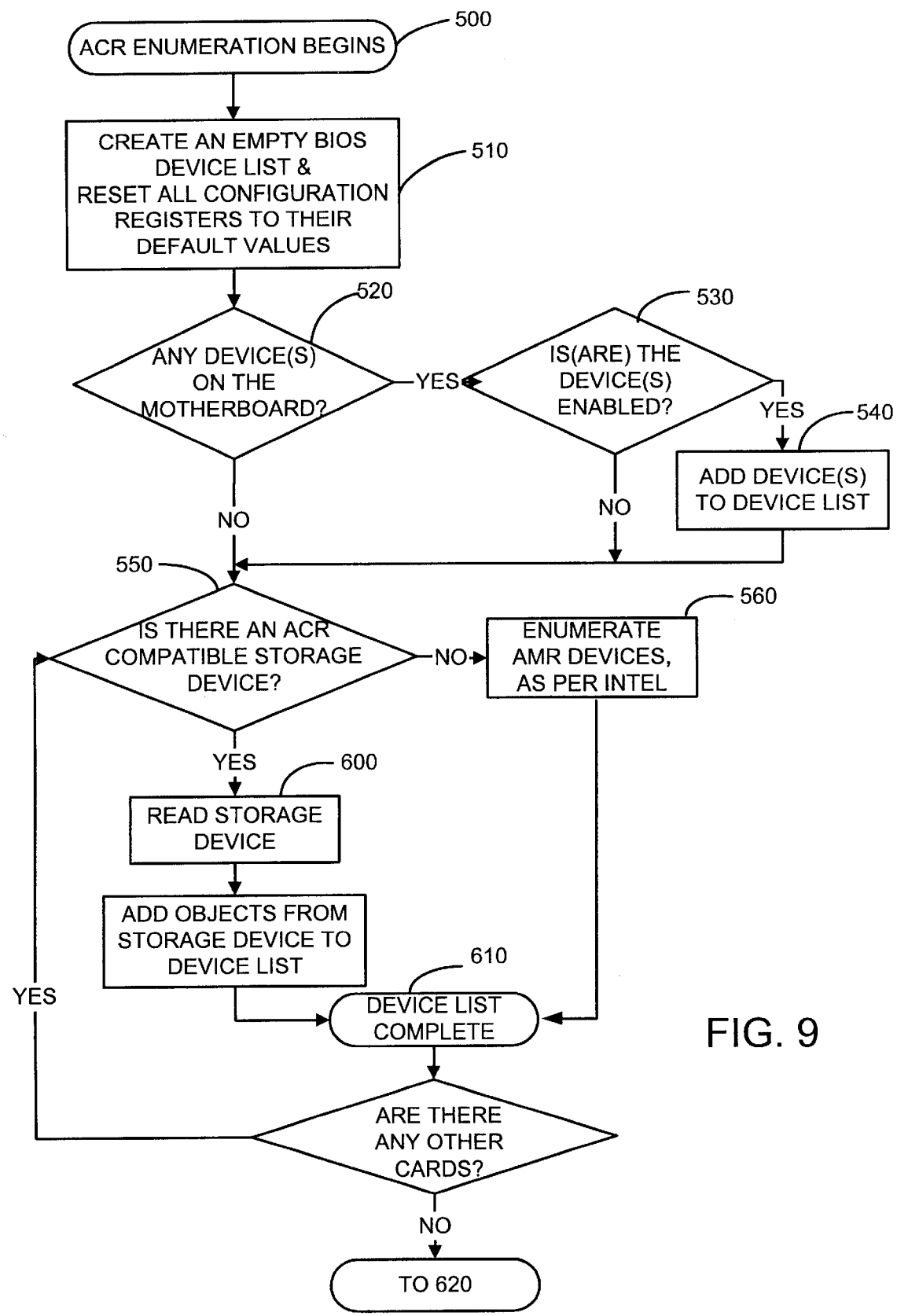
FIG. 9 illustrates an exemplary flow chart of the ACR enumeration utilized in the exemplary system of FIG. 1.

FIG. 9 illustrates an exemplary flow chart for performing ACR enumeration using the ACR serial bus 56. The buses feeding the riser card 10 are comprised of buses 52–72, most originating from a corresponding dedicated controller 100–120. Preferably each of these controllers 100–120 is addressed individually, and therefore may be individually identifiable to the BIOS 124. As a result, any controller 100–120 installed on the motherboard 98 as well as peripheral devices 24–48 on the riser card 10 may be considered during the ACR enumeration.

After a Power On Self Test ("POST") and general initialization of the computer boot procedure, the ACR enumeration process can begin at step 500. Alternatively, an equivalent process may be executed by the BIOS 124 upon motherboard 98 reset. Any computer system implementing a BIOS 124 may provide enumeration for devices on the motherboard 98 and peripheral devices 24–48 located on the riser card 10.

At step 510, the BIOS 124 may create an empty device list containing the header information for an object entry. The BIOS 124 may begin creating the BIOS device list based on objects already defined in the BIOS 124 such as devices on the motherboard 98, or peripheral devices 24–48 on the riser card 10. The objects may be defined as data burned into the BIOS 124 by the manufacturer or via the BIOS 124 set-up, or any other appropriate method. For example, according to the described embodiment the BIOS device list may be created in system RAM or a suitable register or memory. Additionally, all configuration space registers in the controllers 100–120 may be set to default values that do not conflict with another device prior to ACR enumeration.

At step 520, the BIOS 124 detects if any objects or devices are on the motherboard 98. If the BIOS 124 detects an object or device on the motherboard 98, then the BIOS 124 determines if the device(s) specified are enabled per step 530. The BIOS 124 may determine if the devices specified by the objects are enabled by reading an object in the BIOS device list, a BIOS setup entry, detecting jumpers, and so forth. If the BIOS 124 determines that the object(s) are enabled, then the BIOS 124 may add the object or device to the device list per step 540. If there are no detected devices on the motherboard 98 per step 520, or after objects are added to the device list per step 540, then detection of a storage device 50 is performed at step 550.

At step 550, the BIOS 124 determines if a storage device 50 is on the riser card 10. If the storage device 50 is present on the riser card 10, the riser card 10 is considered to be an ACR compatible riser card 10. The BIOS 124 can then read the storage device 50 per step 600. For example, the BIOS 124 may read the contents of the storage device 50 and look for a header (84 in FIG. 6) and checksum. If the header is present and the checksum is correct, then the contents of the storage device 50 may be presumed valid and the riser card 10 is a valid ACR compatible riser card 600. Thus, per step 600, the storage device 50 is read by the BIOS 124.

At step 605, the objects from the storage device 50 (e.g., objects 88 in FIG. 6) are added to the BIOS device list such that the peripheral devices 24–48 are included in the BIOS device list.

At step 610, the BIOS device list is complete for that particular riser card 10.

If a storage device 50 is not detected, per step 550, the riser card is assumed to be an AMR card and consequently the BIOS 124 enumerates the AMR card per step 560, according to the AMR specification.

Figure 10:
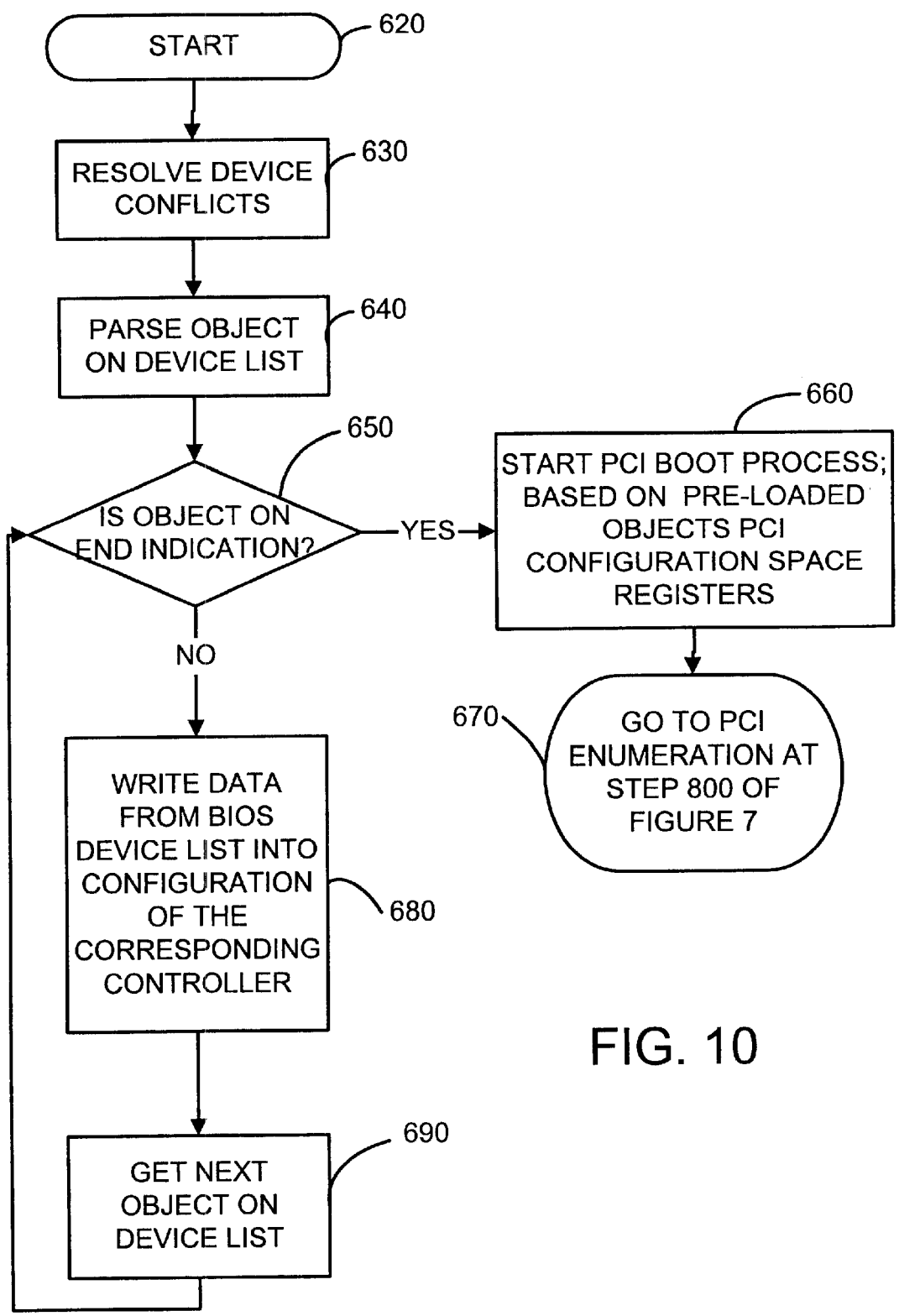
FIG. 10 illustrates an exemplary flow chart of programming a configuration space of the controllers shown in FIG. 1.

FIG. 10 illustrates an exemplary flowchart for programming the configuration space of the appropriate controller 100–120 on the motherboard. The controllers 100–120 are advantageously programmed in response to the BIOS device list, such as the BIOS device list generated in FIG. 9.

At step 630, peripheral device 24–48 conflicts are preferably resolved. The BIOS 124 can arbitrate conflicts that may exist between peripheral devices 24–48 and any additional devices on the motherboard 98, before programming the controllers 100–120. For example, if a peripheral device similar to one of the peripheral devices 24–48 on the riser card 10 exists on the motherboard 98, the BIOS 124 may chose to disable the peripheral device on the motherboard 98. Likewise, the BIOS 124 may disable the peripheral device 24–48 on the riser card 10 if a similar peripheral device exists on the motherboard 98. In either example the BIOS 124 preferably resolves any conflicts by disabling of the conflicting devices.

At step 640, the configuration process starts by parsing each object in the BIOS device list. The BIOS 124 will attempt to parse the objects listed in the BIOS device list to the appropriate controller 100–120.

Therefore, at step 650, the objects of the BIOS device list are examined by the BIOS 124 and the contents are parsed to the appropriate controller 100–120. If the object is on end, then the PCI enumeration boot process can begin, per step 660. If not, then data from the object in the BIOS device list is programmed into the configuration space of the relating controller 100–120, at step 680. For example, according to the described embodiment, if an object in the BIOS device list includes information relating to an AMC'97 Codec 24, then the BIOS would preferably parse and write that information into the configuration space of the DC'97 Controller 100.

At step 690, after the previous object in the BIOS device list has been parsed, the BIOS 124 can go to the next object and repeat the steps 630–680. This can continue until the object is at an end and accordingly the PCI boot process per step 660 can begin.

Below is a summary of ACR enumeration, OS enumeration and the device driver loading process for a device on the multifunction bus 160. Step 1 may be executed by PC hardware. Steps 2, through 7 may be performed by the ROM BIOS 124 during boot-up, and steps 8 through 12 may execute under operating system control.

Upon motherboard 98 power up or reset, a POST (Power on Self Test) is first performed. A general initialization of the computer begins the boot process. During this process the computer detects any available devices and creates a device map indicating the presence of a device. All configuration space registers are reset to their default values creating an empty BIOS device list with a header.

According to an exemplary embodiment, the enumeration of the PC may be performed under BIOS control. Based on the objects defined in the BIOS 124 for objects or devices on the motherboard 98 (and on riser card 10 if applicable), the BIOS 124 detects if the devices are enabled and then adds the enabled objects onto the BIOS device list. The BIOS 124 reads the storage device 50 contents (if available) on riser card 10 to look for a checksum and a header.

If no storage device 50 is available and an AMR card is detected, then the BIOS 124 may enumerate the AMR device(s) per the AMR specification. For example, the BIOS 124 may attempt to enumerate the CODEC(s) on the AC'97 bus 52. Instead of programming the configuration registers of the DC'97 controller 97 with the results of the AMR-like enumeration, the BIOS 124 may construct objects with the same information. If however, no AMR objects are found, no entries may be added to the device list.

If the storage device 50 is available, then the BIOS 124 parses the storage device 50 contents and identifies objects as defined within the data structure of the storage device 50. The BIOS 124 adds the objects described in the storage device 50 to the BIOS device list. The BIOS device list is parsed to direct the configuration of the controllers 100–120. Each object is identified as a device Dev, the device controller Vendor ID, System ID ("SID") and any other configuration space parameters. The BIOS 124 also assigns its own defaults (i.e. device ID's) to the configuration space of each controller 100–120 for each device 10 supported in accordance with the identified object(s). When the BIOS device list is complete, the BIOS 124 matches the peripheral devices 24–48 on the riser card 10, devices on the motherboard with their respective controllers 100–120, and programs the controller configuration space registers.

The BIOS 124 disables all controllers 100–120 that do not have peripheral devices 24–48 or motherboard devices attached to them, and declares all applicable configuration space registers as read-only (and otherwise avoids conflicts).

The BIOS 124 runs any specific initializations required, such as initializing the IPB bus 64. PCI enumeration is performed on the configuration space values by assigning computer resources, (also known as linking, mounting or mapping) the parameters specified in the objects of the storage device 50 to the BIOS device list. Enumeration is complete.

The BIOS 124 will read and execute the boot loader. The boot loader is the piece of BIOS 124 code that bootstraps the operating system ("OS").

According to another exemplary embodiment, the PC enumeration can be performed under OS control. First, of course, the OS starts loading.

An optional device driver queries the BIOS 124 for the configuration and enumeration data and enters it in a registry.

The OS scans the PCI bus to read all devices in the system, merges all motherboard devices and matches INF files to the ID registers in the controllers 100–120 configuration space.

The OS loads the appropriate device driver, pointed to by its entry in the INF file in the configuration space.

The vendor specific device driver starts executing. It can optionally query the BIOS 124 for the enumeration data or read it from the registry if needed.

With the ACR bus devices initialized, the PCI enumeration process completes the discovery and assignment of available devices. Preferably the PCI Enumeration process is executed after the ACR enumerates devices to program the PCI configuration space of the host controllers. PCI Enumeration process can then examine the PCI configuration space to report the corrected devices on the system as described in more detail below.

Referring now to FIG. 11, shown is a flow chart further detailing an exemplary PC enumeration process beginning at Step 800. At Step 810, the BIOS device list is empty awaiting assignment of the appropriate BIOS device list which is generated according to the devices found on the system and connected cards and devices. The BIOS device list informs the BIOS of the available devices so that clients wishing to use the device can access them.

At Step 820 the motherboard 98 is examined to discover and identify any devices that reside on the motherboard 98. If devices reside on the motherboard 98, they are checked to determine if the devices are enabled at Step 830. If the device is enabled, the device is added to the device list at Step 840.

At Step 850, PCI enumeration checks for PCI devices on PCI cards in PCI slots.

At Step 860, the discovered devices are checked to determine if they are enabled. If the devices are enabled, the configuration space of each device controller is read.

At Step 870, the object read from the configuration space of the active device is added to the device list.

At Step 880, when the devices have been discovered and the device lists generated the PCI slots that are empty are disabled. For example, the BIOS can disable the configuration space of host controllers associated with devices that are not present in the system. Disabling the host controllers can prevent the OS from detecting non-existent devices.

At Step 890, system resources can be assigned to the device objects in the generated lists. For example, the devices are assigned a unique base address and interrupt level.

At Step 900, the appropriate device drivers are loaded using information from the object list. For example, the Vender ID and Device ID Registers can identify appropriate device drivers.

As the operating system continues to boot, the operating system will examine the configuration space of all enabled controllers 100–120. Therefore, there is no distinction whether a peripheral device 24–48 is physically a riser card 10 or motherboard 98. The peripheral device 24–48 may be contained in a card, either on a riser card 10 or the motherboard 98. However, the contents of the configuration space of the controllers 100–120 may vary depending on the device's location and method of enumeration.

The present embodiment provides many different uses and advantages. For example, the present embodiments provide a flexible method of discovering and integrating plug-and-play peripheral devices. The present embodiments provide an enumeration process to enable new devices to be discovered and assigned the appropriate device parameters and drivers without conflict with existing devices such as devices on other peripheral cards as well as motherboard-based devices. BIOS entry points can also be created to allow software programs to access and utilize the device parameters. The embodiments herein are also backward compatible with existing AMR standard systems and can provide a standard interface for future communication devices.

The present embodiments also save circuit board space on peripheral cards enabling reduced sized peripheral cards when connector pin outs are advantageously assigned as described herein. Moreover, by utilizing the multi-function bus system architecture, devices on the expansion or peripheral card can be addressed via one or more input/output buses to provide the advantage of addressing and transferring data from the peripheral devices to the motherboard. Further yet, capacitative coupling and grounding problems of older buses are reduced or not present on the multi-function bus, because long and parallel circuit traces are purposely avoided. Consequently, the multi-functional bus system allows for faster data transfer.

Because of the present embodiments, multiple and diverse communication devices such as network interfaces, DSL and wireless interfaces, can be accommodated on a single, scalable circuit card saving board space and PCI slots. Due to the scalable architecture, future extensions and expansion can be added to existing systems.

According to the exemplary embodiment, provided below are several examples of the enumeration process generating an appropriate device list. First is an example of a device list for an empty ACR compatible riser card. It is comprised of a riser card with just the enumeration storage device on board, and no peripheral devices. The listing below shows the minimum possible device list for this scenario.

| Offset | Size | Data (Hex) | Description |
|---|---|---|---|
| 0 | 4 | 41 43 52 00 | "ACR" 00h. the ACR header. |
| 4 | 3 | 00 01 28 | END object. Signals the end of enumeration data. See section 8.13.4.1 for a description of the END object. |

Second, shown below is a more complete device list of the same riser card without peripheral devices. The device list includes an object descriptor for the riser card with a name, serial number and a user-defined flag byte. It also includes a description of the storage device, so that a portion of it can be used by other applications.

| Offset | Size | Data (Hex) | Description |
|---|---|---|---|
| 0 | 4 | 41 43 52 00 | "ACR" 00h. the ACR header. |
| 4 | 2 | 10 1F | Start riser object. Describes the riser card itself |
| 6 | 25 | 70 17 41 63 6D 65 20 49 6E 63 2E 20 6E 75 6C 6C 41 43 20 72 69 73 65 72 00 | Name item. "Acme Inc. null ACR riser", null-terminated, in ASCII. |
| 31 | 6 | 85 01 78 56 34 12 | Serial number item. Serial number is in BCD format. Serial number data: serial # is 1234578. |
| 37 | 2 | F1 00 | ITEM_USER. Carries vendor-defined data Just a "flag" byte visible to all drivers. |
| 39 | 2 | 97 04 | EEPROM object connected to serial bus |
| 41 | 4 | 93 07 00 60 | ITEM_CAPACITY. Specifies the EEPROM EEPROM capacity is 128 bytes Last 32 bytes are free for other uses. |
| 45 | 3 | 00 01 chk | END object. Signals the end of enumeration data. Checksum byte. |

Third, is an example of a riser card having an AMR compatible software modem. One of the many possible configurations of a software modem on an AMR card will contain a modem CODEC. To make that design compliant with the ACR specification, the hardware vendor should also provide a properly programmed storage device connected to the serial bus. This example shows a possible device list that would result in the same ID's as an AMR card might.

The bytes ssvidl, ssvidh, ssidl and ssidh in the table below is preferably set to the desired resulting value in the Subsystem Vendor ID and Sybsystem ID registers of the host controller" configuration space. They depend on the values obtained from the AC-Link CODEC ID registers at addresses 7Ch and 7Eh. For clarity, only required data is included in the table. The vendor is free to add any other descriptors as necessary.

This example is functional independent of whether there is a sound CODEC on the motherboard. If there is one, the BIOS must provide the enumeration data for it, and the riser card does not need to be aware of it.

| Offset | Size | Data (Hex) | Description |
| --- | --- | --- | --- |
| 0 | 4 | 41 43 52 00 | "ACR" 00h. the ACR header. |
| 4 | 2 | 31 05 | Object: Modem on AC-Link |
| 6 | 5 | 14 | ITEM_SUBID |
|  |  | ssvidl ssvidh | Desired Subsystem Vendor ID, LSB first. |
|  |  | ssidl ssidh | Desired Subsystem ID, LSB first. |
| 11 | 3 | 00 01 chk | END object. Signals the end of enumeration data. |

Fourth, is a device list of a riser card having an AMR compatible audio and modem card. The list below shows the storage device contents of an audio modem combo card, with both CODECs sharing the AC-Link bus.

| Offset | Size | Data (Hex) | Description |
| --- | --- | --- | --- |
| 0 | 4 | 41 43 52 00 | "ACR" 00h. the ACR header. |
| 4 | 2 | 21 05 | Object: Sound on AC-Link |
| 6 | 5 | 14 | ITEM_SUBID. Provides ID's for the |
|  |  | ssvidl ssvidh | sound CODEC. |
|  |  | ssidl ssidh | Desired Subsystem Vendor ID, LSB first. |
|  |  |  | Desired Subsystem ID, LSB first. |
| 11 | 2 | 31 05 | Object: Modem on AC-Link. |
| 13 | 5 | 14 | ITEM_SUBID. Provides ID's for the |
|  |  | ssvidl ssvidh | sound CODEC. |
|  |  | ssidl ssidh | Desired Subsystem Vendor ID, LSB first. |
|  |  |  | Desired Subsystem ID, LSB first. |
| 18 | 3 | 00 01 chk | END object. Signals the end of enumeration data. |

Fifth, a device list of a riser card having an ACR-style sound and modem card. A difference between this setting and the previous example is the data in the storage device. While in the AMR enumeration process the values for Vendor ID and Device ID are always set to their defaults, the ACR card can attempt to change them. Because it is recommended but not required that the AC-Link controller function in the ACR motherboard have the Vendor ID and Device ID registers writable, these values may remain set to their default values.

In this example, it is desired that at the end of the enumeration process, the audio device ID's be set to 12B9:2038 FOR Vendor ID and Device ID, and 12B9:0072 for Subsystem Vendor ID and Subsystem ID. The modem object will attempt to set the ID's to 12B9:3005 and 12B9:0003 respectively. Since the Vendor ID and Device ID may be hardwired in some host controllers, the INF file and device driver should be prepared to connect to the device at (8086:2415, 12B9:0072) and (8086:2416, 12B9:0003).

| Offset | Size | Data (Hex) | Description |
| --- | --- | --- | --- |
| 0 | 4 | 41 43 52 00 | "ACR" 00h. the ACR header. |
| 4 | 2 | 21 09 | Object: Sound on AC-Link |
| 6 | 9 | 28 | ITEM_SUBID. Provides ID's for the |
|  |  | B9 12 | sound CODEC. |
|  |  | 38 20 | Desired Vendor ID, LSB first. |
|  |  | B9 12 | Desired Device ID, LSB first. |
|  |  | 72 00 | Desired Subsystem Vendor ID |
|  |  |  | Desired Subsystem ID, LSB first. |
| 11 | 2 | 31 05 | Object: Modem on AC-Link. |
| 17 | 9 | 28 | ITEM_SUBID. Provides ID's for the |
|  |  | B9 12 | sound CODEC. |
|  |  | 38 20 | Desired Vendor ID, LSB first. |
|  |  | B9 12 | Desired Device ID, LSB first. |
|  |  | 72 00 | Desired Subsystem Vendor ID |
|  |  |  | Desired Subsystem ID, LSB first. |
| 26 | 3 | 00 01 chk | END object. Signals the end of enumeration data. |

Sixth, a device list of a riser card having an Audio/modem/HPNA combination of peripheral devices. This example combines the audio and modem functionality with an HPNA PHY on board.

The HPNA PHY in this example requires that only the Vendor ID and Device ID registers be set to reflect the hardware. The subsystem Vendor ID and Subsystem ID registers are unimportant in this case, and can be left with their defaults. The INF file for the driver must be keyed to 12B:2A04 in the Vendor ID and Device ID fields.

| Offset | Size | Data (Hex) | Description |
| --- | --- | --- | --- |
| 0 | 4 | 41 43 52 00 | "ACR" 00h. the ACR header. |
| 4 | 2 | 21 05 | Object: Sound on AC-Link |
| 6 | 5 | 14 | ITEM_SUBID. Provides ID's for the |
|  |  | ssvidl ssvidh | sound CODEC. |
|  |  | ssidl ssidh | Desired Subsystem Vendor ID, LSB first. |
|  |  |  | Desired Subsystem ID, LSB first. |
| 11 | 2 | 31 05 | Object: Modem on AC-Link. |
| 13 | 5 | 14 | ITEM_SUBID. Provides ID's for the |
|  |  | ssvidl ssvidh | sound CODEC. |
|  |  | ssidl ssidh | Desired Subsystem Vendor ID, LSB first. |
|  |  |  | Desired Subsystem ID, LSB first. |
| 20 | 5 | 04 | ITEM_DEVID. Assigns Vendor ID and |
|  |  | B9 12 | Device ID. |
|  |  | 04 2A | Vendor 12B9 is 3Com |
|  |  |  | Vendor-assigned Device ID |
| 25 | 3 | 00 01 chk | END object. Signals the end of enumeration data. |

Seventh, a device list of a riser card having a DSL modem with software protection. This example shows how to describe a DSL modem while insuring that its devices driver software would work in conjunction with this particular device. This mechanism provide protection for the device driver: in order to execute the code the hardware device must be present, acting as an enabling key to the software.

There are two distinct ways to accomplish this functionality, and the two methods can be combined to accomplish "extra" security. The first method assigns the key validation task to the software. When the OS loads the device driver, it must request that the BIOS provide enumeration information, parse the data and decide whether the correct hardware is present.

To implement this method, a vendor-defined field is used authenticate the device. The values of the PCI configuration space ID registers are unimportant (from the enumeration and security point of view) because the INF file can be written to connect to any combination of values, including the default ID's of the controllers. 12B:1004 is used for this example.

The table below shows how to implement the device list as described above. The BIOS will parse this data during enumeration and assign 12B9:1004 to the Device ID and Vendor ID registers. The Operating System will start to load and find the host controller. It will look for the INF file that matches and start loading the corresponding device driver.

The driver must request the device list from the BIOS and look for the "magic" key, in this case a user defined item with the ASCII string "3Com". If the key is found, the driver proceeds to load normally. Otherwise, the driver can notify the OS that it was not successful.

| Offset | Size | Data (Hex) | Description |
|---|---|---|---|
| 0 | 4 | 41 43 52 00 | "ACR" 00h. the ACR header. |
| 4 | 2 | 63 0A | Object: DSL modem on the DSL bus |
| 6 | 5 | 04 B9 12 04 10 | ITEM_SUBID. Assigns 12B9:1004 to Vendor ID and Device ID. |
| 11 | 2 | F4 33 43 4F 4D | Vendor defined item ASCII for "3COM". This is the enabling key. |
| 16 | 3 | 00 01 chk | END object. Signals the end of enumeration data. |

The second method enforces the matching of the driver and hardware by requesting that the BIOS disable the host controller if it cannot assign the required ID's to the configuration space registers. At the end of the configuration, but before the OS loads, if the host controller is left enabled by the BIOS it is guaranteed that its IDS registers match those specified in the enumeration storage device.

When the OS loads, it will encounter a PCI device with a set of ID's, and will scan the INF files for one that matches it. Only the correct driver will have matching INF ID's, therefore matching is guaranteed.

The table below lists the contents of the storage device illustrating this method. The ID's chosen for this example are 12B9:1004. Although the system ID's are not specified or checked) in this example, the vendor is encourage to expand the data to include them.

| Offset | Size | Data (Hex) | Description |
|---|---|---|---|
| 0 | 4 | 41 43 52 00 | "ACR" 00h. the ACR header. |
| 4 | 2 | 63 0A | Object: DSL modem on the DSL bus |
| 6 | 5 | 04 B9 12 04 10 | ITEM_SUBID. Assigns 12B9:1004 to Vendor ID and Device ID. |
| 11 | 9 | 38 B9 12 04 10 00 00 00 00 | ITEM_DEVIDCHK. See section 8.13.5.4. Vendor ID must be set to 12B9 in the hardware. Vendor ID must be set to 1004 in the hardware. Do not check Subsystem Vendor ID-assume match. Do not check Subsystem ID-assume match. |
| 20 | 3 | 00 01 chk | END object. Signals the end of enumeration data. |

Additional details of the exemplary embodiment, a detailed description of an exemplary object data structure and exemplary enumeration process, are provided below. For further details of the particular exemplary embodiment, reference can be made to the below description.

Objects are typically followed by optional data items, where each data item describes a characteristic of the object. Data items include a header containing the Item and Isize fields, followed by the item payload. In some cases, however, the Item and Isize fields are omitted. The Item field preferably specifies the meaning of the information in the payload, while the Isize preferably specifies the size of the data payload.

Item and Isize are packed into an 8-bit byte item header as shown below:

| 7 | 6 | 5 | 4 | 3 | 2 | 1 | 0 |
|---|---|---|---|---|---|---|---|
| Item | | | | Isize | | | |

The value encoded in the Item field selects among the possible Item types.

The value in Isize preferably encodes the number of bytes in the Item's payload. If Isize is set to Oh then the byte immediately following the Item Header contains the 8-bit Isize value. The offsets shown in the item formats in the next sections do not reflect the use of the extended size byte. Therefore, if the 8-bit version of Isize is used, it should be placed in offset 1, and all offsets shown for data items will be adjusted accordingly.

Encoding of the item field:

| Item | Name | Payload data item |
|---|---|---|
| 0 | ITEM_DEVID | Vendor ID and Device ID. These 2 16-bit values follow the header byte, in the order specified, LSB first. |
| 1 | ITEM_SUBID | Subsystem Vendor ID and Subsystem ID. These 2 16-bit values follow the header byte, in the order specified, LSB first. |
| 2 | ITEM_DEVSUBID | Vendor ID, Device ID, Subsystem Vendor ID and Subsystem ID. These 4 16-bit values follow the header byte, in the order specified, LSB first |
| 3 | ITEM_DEVIDCHK | Requests verification of the Vendor ID, Device ID, Subsystem Vendor ID and Subsystem ID values programmed in the PCI configuration space of the host controller. |
| 4 | ITEM_CLASS | PCI class code. 3 bytes, Prog. I/F, Sub-Class Code and Class code immediately follow the header in the order specified. |
| 5 | ITEM_MINGNT | Min_Gnt value for PCI config space. One 8-bit data byte follows as payload. |
| 6 | ITEM_PCIPWRMG | PCI power management data. See description below. |
| 7 | ITEM_NAME | Null terminated ASCII string. |
| 8 | ITEM_SERNUM | Serial number |
| 9 | ITEM_CAPACITY | Device capacity |
| 10–13 | | Reserved |
| 14–15 | ITEM_USER | User defined |

ITEM_DEVID

This Item type is used to identify the vendor and device. It can be used to label the ACR riser card itself or any functional peripheral or analog device on the card.

If this item is included in the description of a functional object with a controller on the motherboard, the BIOS preferably attempts to program the specified ID fields into the corresponding registers in the configuration space of the controller. The BIOS will not verify if the configuration space write operation was successful or not. If the host controller's register(s) cannot be written they will retain their original values.

If any of the ID fields of this item is set of 0000h, the BIOS will not attempt to write to the corresponding configuration space register. Such register will retain its default value.

| Offset | Size | Description |
|---|---|---|
| 0 | 1 | Item header. For this item the header value must always be 04h |
| 1 | 2 | Vendor ID, as specified by the PCI SIG, LSB first. |
| 3 | 2 | Device ID, as specified by the PCI SIG, LSB first. |

ITEM_SUBID

This item type is preferably used to identify the subsystem vendor and subsystem ID. It can be used to label the ACR card itself or any functional device on board. The Subsystem Vendor ID and Subsystem ID fields must comply with the PCI SIG specifications.

If this item is included in the description of a functional object with a PCI-based host controller, the BIOS must attempt to program the specified ID fields into the corresponding registers in the PCI configuration space of the host controller. The BIOS will not verify if the configuration space write operation was successful or not. If the host controller's register(s) cannot be written they will retain their original values.

If any of the ID fields of this item is set to 0000h, the BIOS will not attempt to write to the corresponding configuration space register. Such register will retain its default value. See section 8.14 for configuration space registers defaults.

| Offset | Size | Description |
|---|---|---|
| 0 | 1 | Item header. For this item the header value must always be 14h |
| 1 | 2 | Subsystem Vendor ID, as specified by the PCI SIG, LSB first. |
| 3 | 2 | Subsystem ID, as specified by the PCI SIG, LSB first |

ITEM_DEVSUBID

This item type is preferably used to identify the vendor ID, device ID, Subsystem Vendor ID and Subsystem ID. It can be used to label the ACR card itself or any functional device on board. The four ID fields should comply with the PCI SIG specifications to enable compatibility.

If this item is included in the description of a functional object with a PCI-based host controller, the BIOS preferably attempts to program the specified ID fields into the corresponding registers in the PCI configuration space of the host controller. The BIOS will not verify if the configuration space write operation was successful or not. If the host controller's register(s) cannot be written they will retain their original values.

If any of the ID fields of this item is set to 0000h, the BIOS will not attempt to write to the corresponding configuration space register. Such register will retain its default value. See section 8.14 for configuration space registers defaults.

ITEM_DEVSUBID is intended as a shortcut when both ITEM_DEVID and ITEM_SUBID need to be specified.

| Offset | Size | Description |
|---|---|---|
| 0 | 1 | Item header. For this item the header value must always be 28h |
| 1 | 2 | Vendor ID, as specified by the PCI SIG, LSB first. |
| 3 | 2 | Device ID, as specified by the PCI SIG, LSB first. |
| 5 | 2 | Subsystem Vendor ID, as specified by the PCI SIG, LSB first. |
| 7 | 2 | Subsystem ID, as specified by the PCI SIG, LSB first. |

ITEM_DEVIDCHK

This item type is preferably used to verify the vendor ID, device ID, Subsystem Vendor ID and Subsystem ID programmed in the host controller's PCI configuration space. Such verification may be desired to ensure that a certain host controller will only be available in conjunction with a specific add-on card, thus protecting the host controller's IP.

The ITEM_DEVIDCHK specifies a list of host controller ID's that are acceptable by the device being enumerated. Each entry in the list is composed of 8 bytes representing the Vendor ID, Device ID, Subsystem Vendor ID and Subsystem ID to be matched. If any of these values is set to 0000h then the BIOS will not verify that particular register and assume a match.

The number of entries in the list is specified by the Isize parameter in the Item Header. The actual number of data bytes specified must be a multiple of 8: partial ID entries are not allowed and may result in unpredictable behavior.

If, after testing all entries in the ITEM_DEVIDCK ID list, a match is not found, the BIOS must disable the host controller by writing zeroes to all programmable ID registers, BAR registers and the Interrupt Line register in configuration space. If the BIOS has enough control and the hardware supports it, the BIOS must also logically remove the host controller from the system.

The table below shows the format of the ITEM_DEVIDCHK item. Please note that there can be any number of PCI ID quadruples in the ID list.

| Offset | Size | Description |
|---|---|---|
| 0 | 1 | Item header. |
| 1 | 2 | 1st entry: Vendor ID, as specified by the PCI SIG, LSB first. |
| 3 | 2 | 1st entry: Device ID, as specified by the PCI SIG, LSB first. |
| 5 | 2 | 1st entry: Subsystem Vendor ID, as specified by the PCI SIG, LSB first. |
| 7 | 2 | 1st entry: Subsystem ID, as specified by the PCI SIG, LSB first. |
| 9 | 8 | 2nd entry: Vendor Id, Device ID, Subsystem Vendor ID, Subsystem ID |
| ? | 8 | . . . Vendor Id, Device ID, Subsystem Vendor ID, System ID |
| ? | 8 | Nth entry: Vendor Id, Device ID, Subsystem Vendor ID, Subsystem ID |

ITEM_CLASS

The ITEM_CLASS type specifies a 3-byte value to be populated in the PCI configuration space of a PCI host controller. The use of the ITEM_CLASS type allows the ACR device manufacturer to override the default class type of a given host controller.

| Offset | Size | Description |
|---|---|---|
| 0 | 1 | Item header. For this item the header value must always be 43h |
| 1 | 1 | Programming I/F. This value maps to address 09h in PCI configuration space. |
| 2 | 1 | Sub-Class Code. This value maps to address 0Ah in PCI configuration space. |
| 3 | 1 | Class Code. This value maps to address 0Bh in PCI configuration space. |

ITEM_MINGNT

The ITEM_MINGNT type specifies a 1-byte value to be populated in the PCI configuration space of a PCI host controller. The use of the ITEM_MINGNT type allows the ACR device manufacturer to override the default Min-Gnt of a given host controller.

| Offset | Size | Description |
|---|---|---|
| 0 | 1 | Item header. For this item the header value must always be 51h |
| 1 | 1 | Min_Gnt value. This value maps to address 3Eh in PCI configuration space. |

ITEM_PCIPWRMG

The function of the ITEM_PCIPWRMG item is to convey power management information to the PCI configuration space of a host controller. PCI devices report its power management related features in its configuration space registers. A 2 DWORD Capability record with Capability ID set to 01h exists for all devices that support power management. The PCI 2.2 specification is hereby fully incorporated by reference. Please refer to the PCI 2.2 specification and the PCI Bus Power Management Interface Specification Revision 1.1 for more information.

The data stored under the ITEM_PCIPWRMG is destined to the Power Management Capability registers. Host controllers that implement power management must be prepared to accept relevant data from the ITEM_PCIPWRMG item.

All devices that connect to a PCI host controller report their power management capabilities using this item. Devices that attach to a PCI host controller and do not contain an ITEM_PCIPWRMG in its object do not support power management.

The host controller can provide some functionality even for devices that do not support power management. The BIOS must be aware of the power management capabilities of the host controllers and ensure that they are enabled to the extend supported by devices.

The format of the ITEM_PCIPWRMG item is shown below.

| Offset | Size | Description |
|---|---|---|
| 0 | 1 | Item header. |
| 1 | 2 | ACRPMC. Data destined to the PCI PMC register. See description below. |
| 3 | 2 | Data Pair 1 |
| 5 | 2 | ... |
| ? | 2 | Data Pair n |

The ACRPMC contains data to be fed into the PMC register in the PCI configuration space of host controllers that support PCI 2.2 power management. This field is a 16-bit word, stored LSB first. The format of the ACRPMC field is described below.

| 15 | 14 | 13 | 12 | 11 | 10 | 9 | 8 |
|---|---|---|---|---|---|---|---|
| PME_D3C | PME_D3 | PME_D2 | PME_D1 | PME_D0 | D2SUP | D1SUP | AUXC2 |

| 7 | 6 | 5 | 4 | 3 | 2 | 1 | 0 |
|---|---|---|---|---|---|---|---|
| AUXC1 | AUXC0 | DSINIT | RES | RES | RES | RES | RES |

Bits 15 through 11. These bits specify, for each power state, whether the device can generate a power management event. A bit set to one indicates that the device can generate an event.

Bit 15: PME_D3C. Set to 1 if PME from D3cold is possible.

Bit 14: PME_D3. Set to 1 if PME from D3 (hot) is possible.

Bit 13: PME_D2. Set to 1 if PME from D2 is possible.

Bit 12: PME_D1. Set to 1 if PME from D1 is possible.

Bit 11: PME_D0. Set to 1 if PME form D0 is possible.

Bit 10: D2SUP. Set to 1 if the device supports D2.

Bit 9: D1SUP. Set to 1 if the device supports D1.

Bit 8 through 6. These bits map to bits 8 through 6 of the PMC register as specified by the PCI 2.2 specification and specify the maximum current draw from the 3.3 Vaux supply.

Bit 5: DSINIT. This bit must be set to 1 if the device requires a specific initialization for class driver to use. See PCI 2.2 specification.

Bits 4 through 0. Reserved. Must be set to 0.

The Data Pair carries information destined to the PMCSR and DATA registers in the PCI configuration space of the host controller. It carries information about the actual power use of the device. The number of data pairs specified is determined by the size of the ITEM_PCIPWRMG item.

The first byte of the pair specify the index and scale, and the second byte represents the value that must be read from the DATA register when the Data_Select field of the PMCSR register is set to the corresponding index. The scale bits specified in each entry can be made available in the Data_Scale field of the PMCSR.

The format of the two bytes is shown below.

Byte 1:

| 7 | 6 | 5 | 4 | 3 | 2 | 1 | 0 |
|---|---|---|---|---|---|---|---|
| Scale | | Reserved | | Dselect | | | |

Byte 2:

| 7 | 6 | 5 | 4 | 3 | 2 | 1 | 0 |
|---|---|---|---|---|---|---|---|
| Power Data | | | | | | | |

Bits 7 and 6: SCALE

These bits describe the scale of the power data in the next byte. It can optionally be made to appear in bits 14 and 13 of the PMCSR register when the encoding in bits 12 through 9 of the PMCSR matched the encoding in the DSELECT bits. See the PCI Bus Specification Revision 2.2 and the PCI Bus Power Management Interface Revision 1.1 specifications for details.

Bits 5 and 4: Reserved. These bits must be set to 0.

Bits 3 through 0: DSELECT. This 4-bit field associates the power data in the following byte with the power consumed and dissipated by the device in its various power modes. The encoding must be the same as the Data_Select value encoding specified by the PCI 2.2 specification. Please refer to the PCI Bus Specification Revision 2.2 and the PCI Bus Power Management Interface Revision 1.1 specification for more information.

ITEM_NAME

This item specifies a Friendly Name for a device or the riser card itself. The ITEM_NAME entry can displayed by the BIOS during boot in the same manner that BIOS may display disk drives and PCI cards.

The ITEM_NAME also provides a method for the OS device driver to retrieve a vendor-defined name for the device.

| Offset | Size | Description |
|---|---|---|
| 0 | 1 | Item header. See section 8.13.5 above. |
| 1 | Var | Null-terminated ASCII string |

ITEM_SERNUM

This item is intended to carry the serial number of the ACR card itself. The LEN field in the item header minus one (or minus two if the header contains an additional byte for Isize) encodes the length, in bytes, of the serial number.

The Serial Number format Flag field of this item will determine how the serial number is stored.

| Offset | Size | Description |
|---|---|---|
| 0 | 1 | Item header. See section 8.13.5 above. |
| 1 | 1 | Serial number format flag |
| 2 | Var | Serial number |

The possible values for the Serial Number Format Flag are:

| SNFF | Description |
|---|---|
| 0 | Serial number is binary number, stored LSB first. |
| 1 | Serial number is in packed BCD format, LSB first. |
| 2 | Serial number is in ASCII format, stored from left to right, no trailing zeroes. |
| 3 | Serial number is binary-coded module 36 barcode, LSB first. |
| 4 | Serial number is encoded in a proprietary format. |

ITEM_CAPACITY

This item is intended to describe the capacity of the ACR EEPROM attached to the Serial bus. Devices that use this memory for parameter storage, such as an Ethernet NIC, should read this item in order to determine how much free memory space is available.

| Offset | Size | Description |
|---|---|---|
| 0 | 1 | Item header. For this item the header value must always be 93h |
| 1 | 1 | Power of 2 describing the EEPROM size. 8 = 256 bytes, 9 = 512 bytes, etc. |
| 2 | 2 | 16-bit address of the 1$^{st}$ available byte in the EEPROM is all consumed or cannot be written to. |

ITEM_USER

This data item is used to carry vendor-specific information.

| Offset | Size | Description |
|---|---|---|
| 0 | 1 | Item header. See section 8.13.5 above. |
| 1 | 1 | User defined data |

Controller Default ID's

The BIOS will attempt to assign values to the four ID registers in the PCI configuration space of any host controller as specified in the enumeration EEPROM. If the object data in the EEPROM does not specify a value for a register, or if the value specified is 0000h, then the host controller must keep its default values.

In this particular embodiment, it is preferred that at least the Subsystem Vendor ID and Subsystem ID fields of all generic host controllers be writable by the enumeration and configuration procedures.

During configuration, the BIOS will attempt to write new values to the ID registers in the PCI configuration space of all host controllers that have devices attached. Once the configuration is complete, but before the BIOS attempts to boot the OS, the BIOS must ensure that the ID registers of all enabled host controllers are set to READ-ONLY. The host controller hardware must provide a mechanism to permit the BIOS to write to the ID registers but make them read-only after configuration. This can be accomplished by implementing these registers as write-once as the AC-Link controller for AMR or any other fail-proof mechanism.

The table below shows the default values that must be loaded into the various registers in the PCI configuration space of the host controllers assigned to the ACR subsystem.

The table below marks registers as being of type Read-Only ("RO") or Write-Once ("WO"). There may be special cases where it may be desired to break away from this recommendation, such as when protecting IP or special Original Equipment Manufacturer ("OEM") bundles.

| Host Controller | Vendor ID | Device ID | Sub Vendor ID | Sybsystem ID |
|---|---|---|---|---|
| AC-Link (sound) | Chipset maker ID (WO) | Chipset DevID (WO) | AMR-compliant SSVID (WO) | 0000h (WO) |
| AC-Link (modem) | Chipset maker ID (WO) | Chipset DevID (WO) | | 0000h (WO) |
| Other generic controllers | Chipset maker ID (WO or RO) | Chipset DevID (WO or RO) | Chipset maker ID (WO) | Chipset SSID (WO) |
| Other custom controllers | Chipset maker ID (WO or RO) | Chipset DevID (WO or RO) | Chipset maker ID (WO or RO) | Chipset SSID (WO or RO) |

ACR Plug and Play Functionality

There are several different ways to specify the identify of an ACR device attached to a PCI host controller, depending on how much identification information is specified by the vendor in the EEPROM and the flexibility of the host controller. The ACR card vendor must choose the right amount of information in order to accomplish his or her intention.

Combined with the mechanism used by the OS and functionality of the device driver, it is possible to build solutions that are IP-restricted, IP-open or any degree between them.

A vendor may optionally specify in the enumeration EEPROM the values to be written to the configuration space of the host controller. These values include the Vendor ID and Device ID pair, the Subsystem Vendor ID and Subsystem ID pair, both pairs or none at all.

Provided below are further details of an exemplary embodiment of the enumeration process. The pseudo-code program listing below further illustrates the enumeration procedure, as shown in the flowchart. DevList is a pointer to a pre-allocated region of memory where the device list is assembled.

```
Void ACR_Enumeration(*DevList)
{
    memcpy(DevList, "ACR\0", 4);        // Move header to empty list
    for (all devices on motherboard) do
    {
        if(Motherboard_Device_        // make an object entry in
DevList    Enabled)
            AddDeviceToDevlist        // for all devices enabled
            (DevObject)
    }
    ReadRiserEeprom( );                // Attempt to read EEPROM on
riser card
    ComputeEepromChecksum( );
    If (EEPROM_Not_Present OR
        (Eeprom_Chksum != End_Obj_    // If checksum mismatch
        Chksum))
    {
        Detect_AMR_Devices( );         // Get ID's of all legacy AMR
CODEC's
                                       // See ICH data sheets.
        If(AMR_Devices_Detected)
        {
            // Make object entries for every legacy CODEC found
            // on the AC-Link bus. The entries specify VendorID,
            Device ID,
            // Subsystem Vendor ID and Subsystem ID as expected
            by AMR
cards.
            for (all legacy CODEC's detected)
            {
                BuildACRObject(CODEC, AMR_ID, AMR_SubID);
                AddDeviceToDevlist(Legacy_AMR_Object);
            }
        }
    }
    else                               // EEPROM exists and checksum
matches
    {
        for (all objects in EEPROM)
            AddToDevlist(Eeprom Object);
    }
    AddToDevlist(END_OBJECT);          // Device list end with END
object.
}
```

Provided below are further details of an exemplary embodiment of the BIOS entry points. The pseudo-code program listing below further illustrates exemplary function calls of the BIOS entry points. The BIOS preferably provides a copy of the configuration table to a real mode or protected mode client. The client can provide a region of memory large enough to contain the whole device table.

The function call, BIOS present, is used to determine if the BIOS is present on the host machine.

```
Entry:      AH = ACR_FUNCTION_ID(0B2H)
            AL = ACR_BIOS_PRESENT (001H)
EXIT:       EDX = 20524341H "ARC"
            BH = ACR BIOS major version (01H)
            BL = ACR BIOS minor version (00H)
            AL = Completion code
EXAMPLE:

XOR   EDX,EDX                ;Clean EDX
            MOV   AH,ACR_FUNCTION_ID
            MOV   AL,ACR_BIOS_PRESENT
            INT   1AH                    ;Call ACR BIOS
            OR    AL,AL                  ;test for success
            JNZ   NO_ACR_BIOS
            CMP   EDX,'ACR'              ;ACR BIOS ?
            JNE   NO_ACR_BIOS            ;jump if no ACR
;Store ACR version numbers
            MOV   ACR_VERS,BX            ;Minor & Major
            . . .
```

The function call, Get enumeration table size, is used to determine the amount of memory that a client needs to allocate to hold the enumeration table.

```
ENTRY:      AH = ACR_FUNCTION_ID (0B2H)
            AL = ACR_ENUMSIZE (02H)
EXIT:       EDX = Enumeration table size in bytes
            AL = Completion code
EXAMPLE:

. . .
            MOV   AH,ACR_FUNCTION_ID
            MOV   AL,ACR_ENUMSIZE
            INT   1AH                    ;Call ACR BIOS
            OR    AL,AL                  ;test for success
            JNZ   ACR_ERROR
;
```

-continued

```
; Store tablesize, allocate memory
;
    MOV     TABLESIZE,EDX           ; save it
    PUSH    EDX
    CALL    _MALLOC                 ; Get memory
    ...
    Function call, Get ACR enumeration table.
ENTRY:          AH=ACR_FUNCTION_ID (0B2H)
                AL=ACR_ENUMERATE (03H)
                ES:DI=Memory area to receive enumeration
                table.
EXIT:           EDX=Number of bytes used in memory area
                AL=Completion code
EXAMPLE:

.DATA
BUFF DB         1024 DUP (?)            ; Buffer for enum
                                          table
    ...
    .CODE
    ...
    MOV     AX,@DATA
    MOV     ES,AX
    MOV     AH,ACR_FUNCTION_ID      ; Call into ACR
                                      BIOS
    MOV     AL,ACR_ENUMERATE        ; Build table
    MOV     DI,OFFSET BUFF          ; Buffer Address
    INT     1AH                     ; Call BIOS
    OR      AL,AL                   ; Did it complete
                                      correctly?
    JNZ     ACR_ERROR               ; Did not enumerate
;
; ACR enumeration successful.
;
    ...
```

The function call, Get ACR default controller ID, is used to obtain the default PCI ID's of the host controller for a given ACR bus. These values are most likely "hardwired" into the BIOS code.

```
ENTRY:      AH = ACR_FUNCTION_ID (0B2H)
            AL = ACR_DEFCTRLID (04H)
            BL = Bus number (see section Error! Reference source not
            found.)
EXIT:       BX = PCI handle of host controller
            ECX[31:16] = Device ID
            ECX[15:0] = Vendor ID
            EDX[31:16] = Subsystem ID
            EDX[15:0] = Subsystem Vendor ID
            AL = Completion code
EXAMPLE:

...
    MOV     AH,ACR_FUNCTION_ID
    MOV     AL,ACR_DEFCTRLID
    INT     1AH                     ; Call ACR BIOS
    OR      AL,AL                   ; test for success
    JNZ     ACR_ERROR
;
; Store default PnP ID's of AC'97 controller
;
    MOV     AC97_VENID, ECX         ; save it
    MOV     AC97_SUBID, EDX         ; save it
    ...
```

An operating environment for devices of the present invention may include a processing system with at least one high speed CPU and a memory. It will be appreciated that acts and symbolically represented operations include the manipulation of electrical signals by the CPU. The electrical system represents data bits which cause a resulting transformation or reduction of the electrical signal representation, and the maintenance of data bits at memory locations in a memory system to thereby reconfigure or otherwise alter the CPU's operation, as well as other processing of signals. In accordance with the practices of persons skilled in the art of computer programming, the present invention is described above with reference to acts and symbolic representations of operations that are performed by the processing system, unless indicated otherwise.

The memory locations where data bits are maintained are physical locations that have particular electrical, magnetic, optical, or organic properties corresponding to the data bits. The data bits may also be maintained on a computer readable medium including magnetic disks, optical disks, organic disks and any other volatile (e.g., Random Access Memory ("RAM"), flash RAM) or non-volatile (e.g., Read-Only Memory ("ROM")) mass storage system readable by the CPU.

Preferred and alternative embodiments of the present invention have been illustrated and described. This and other arrangements described herein are shown for purposes of illustration only, and those skilled in the art will appreciate that other arrangements and other elements (e.g., machines, interfaces, functions, etc., whether or not separately known in the prior art) can be used instead, and some elements may be omitted altogether. Further, as in most computer applications, those skilled in the art will appreciate that many of the elements described herein are functional entities that may be implemented as discrete components or in conjunction with other components, in any suitable combination and location. It will be understood, however, that changes and modifications may be made to the invention without deviating from its true spirit and scope, as defined by the following claims.

I claim:

1. A method of interconnecting a first set of devices on a removable electronic circuit card to a second set of devices on a motherboard by a bus, comprising the steps of:

organizing a plurality of pins on the bus of the circuit card according to a plurality of bus functionality (i) needed by the first set of devices and (ii) provided by the motherboard;

grouping the plurality of pins on the bus of the circuit card, wherein each group of pins corresponds to a respective device of the first set of devices;

grouping a plurality of pins on the bus of the motherboard, wherein each group of pins corresponds to a respective device of the second set of devices;

matching each group of pins corresponding with the first set of devices to each pertaining group of pins corresponding with the second set of devices, wherein groups of pins matched between the first set of devices and the second set of devices (i) enable the first set of devices on the card to access the plurality of needed bus functionality provided by the motherboard; and (ii) define a length of the circuit card; and accessing information from a storage device on the circuit card to enable the second set of devices on the motherboard that are communicatively coupled to the first set of devices.

2. The method of claim 1 wherein the bus utilizes fingers located on the electronic circuit card to provide electrical connections with a connector located on the motherboard, and wherein the fingers are sized in accordance with the length of the electronic circuit card.

3. The method of claim 1 wherein the electronic circuit card is an ACR compatible circuit card.

4. The method of claim 1, wherein accessing information from the storage device on the circuit card further comprises accessing information from the storage device on the circuit card to disable at least one of the second set of devices on the motherboard that is not communicatively coupled to the first set of devices.

5. The method of claim 1, wherein the second set of devices comprises at least one host controller.

6. The method of claim 1 wherein the grouping of the pins comprises an AMR serial bus, USB bus, power and ground.

7. The method of claim 6 wherein the grouping of pins further comprises a Serial Bus, a MII bus, an IPB bus, a second MII bus, and a reserved bus.

8. The method of claim 7 wherein the reserved bus is used for a wireless device.

9. An edge pin connector and bus connector, comprising:
   a motherboard;
   a circuit card forming the edge pin connector, the edge pin connector having pins organized so as to enable at least one device on the circuit card to access a plurality of needed bus functionality provided by the motherboard;
   the motherboard having the bus connector for accepting the edge connector so that (i) pertaining pins on the bus connector match to the pins on the edge pin connector so as to enable the at least one device on the circuit card to access the plurality of needed bus functionality provided by the motherboard; and (ii) the pins matched define a length of the circuit card; and
   a basic input/output system (BIOS) arranged to access information from a storage device on the circuit card so as to enable at least one host controller on the motherboard that is communicatively coupled to the at least one device on the circuit card.

10. The edge pin connector and bus connector of claim 9 wherein the size of the circuit card corresponds to the minimum size required by the edge pin connector.

11. The edge pin connector and bus connector of claim 9 wherein the length of the circuit card is less than the length of the bus connector.

12. The edge pin connector and bus connector of claim 9 wherein the length of the circuit card is equal to the length of the bus connector.

13. The edge pin connector and bus connector of claim 9 further comprising:
   a card alignment key on the bus connector;
   a key slot on the edge pin connector for aligning the card alignment key during insertion into the bus connector.

14. The matching edge pin connector and bus connector of claim 9 wherein a first group of pins comprises in combination an AMR, USB, and a plurality of power and ground contacts.

15. The matching edge pin connector and bus connector of claim 9 wherein a second group of pins comprises an ACR serial bus.

16. The matching edge pin connector and bus connector of claim 9 further comprising a group of pins forming a serial bus to form an MII (Media Independent Interface) bus.

17. The matching edge pin connector and bus connector of claim 9 further comprising a fourth grouping of contacts forming a IPB serial bus.

18. The system of claim 9, wherein the basic input/output system (BIOS) is further arranged to access information from the storage device on the circuit card to disable at least one host controller on the motherboard that is not communicatively coupled to the at least one device on the circuit card.

* * * * *